Feb. 6, 1940.                H. J. WHEELER                2,188,934
                              CORN CUTTER
                          Filed Nov. 5, 1936           8 Sheets-Sheet 4
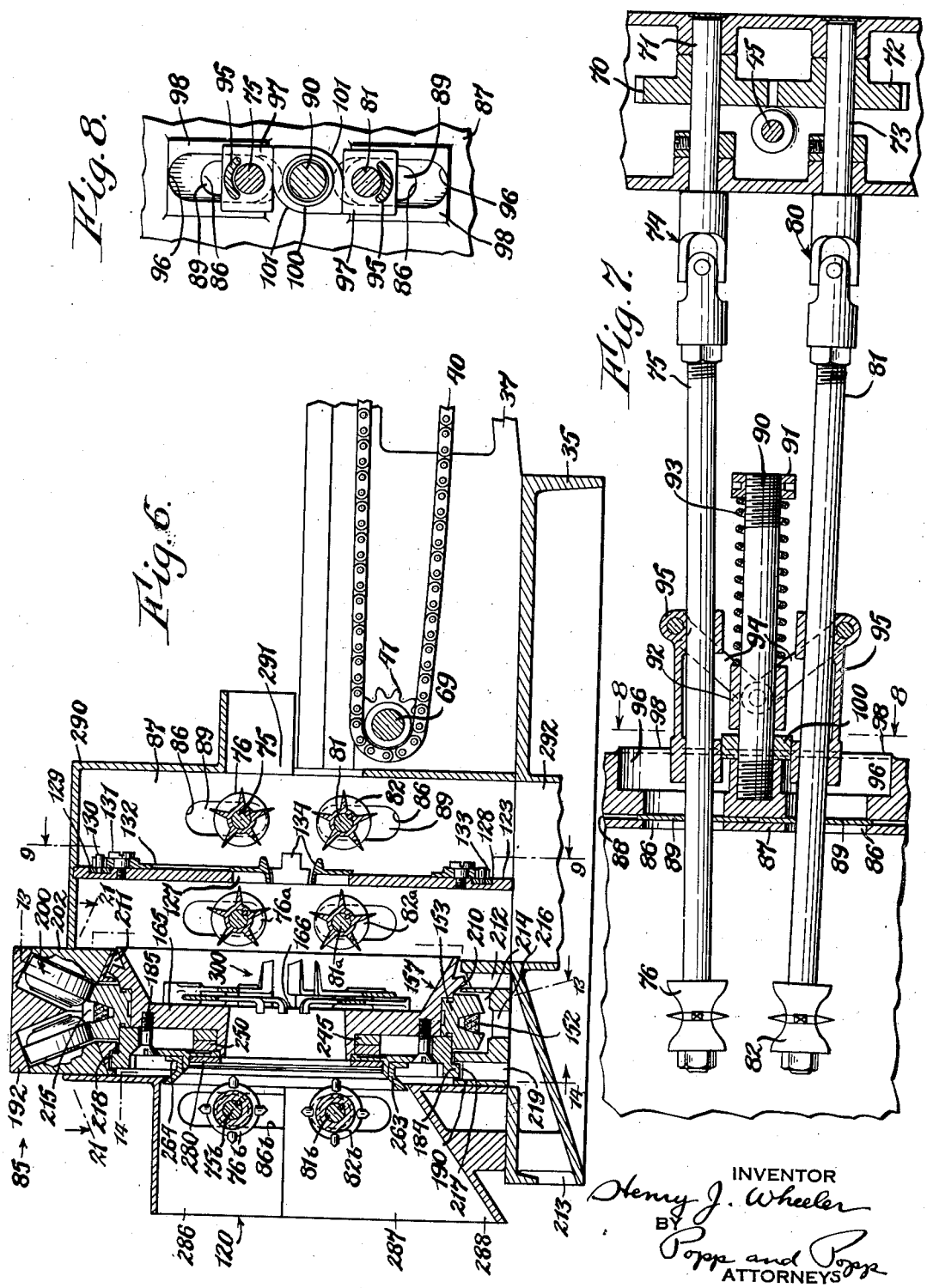
INVENTOR
Henry J. Wheeler
BY
Popp and Popp
ATTORNEYS Feb. 6, 1940.   H. J. WHEELER   2,188,934
CORN CUTTER
Filed Nov. 5, 1936   8 Sheets-Sheet 5
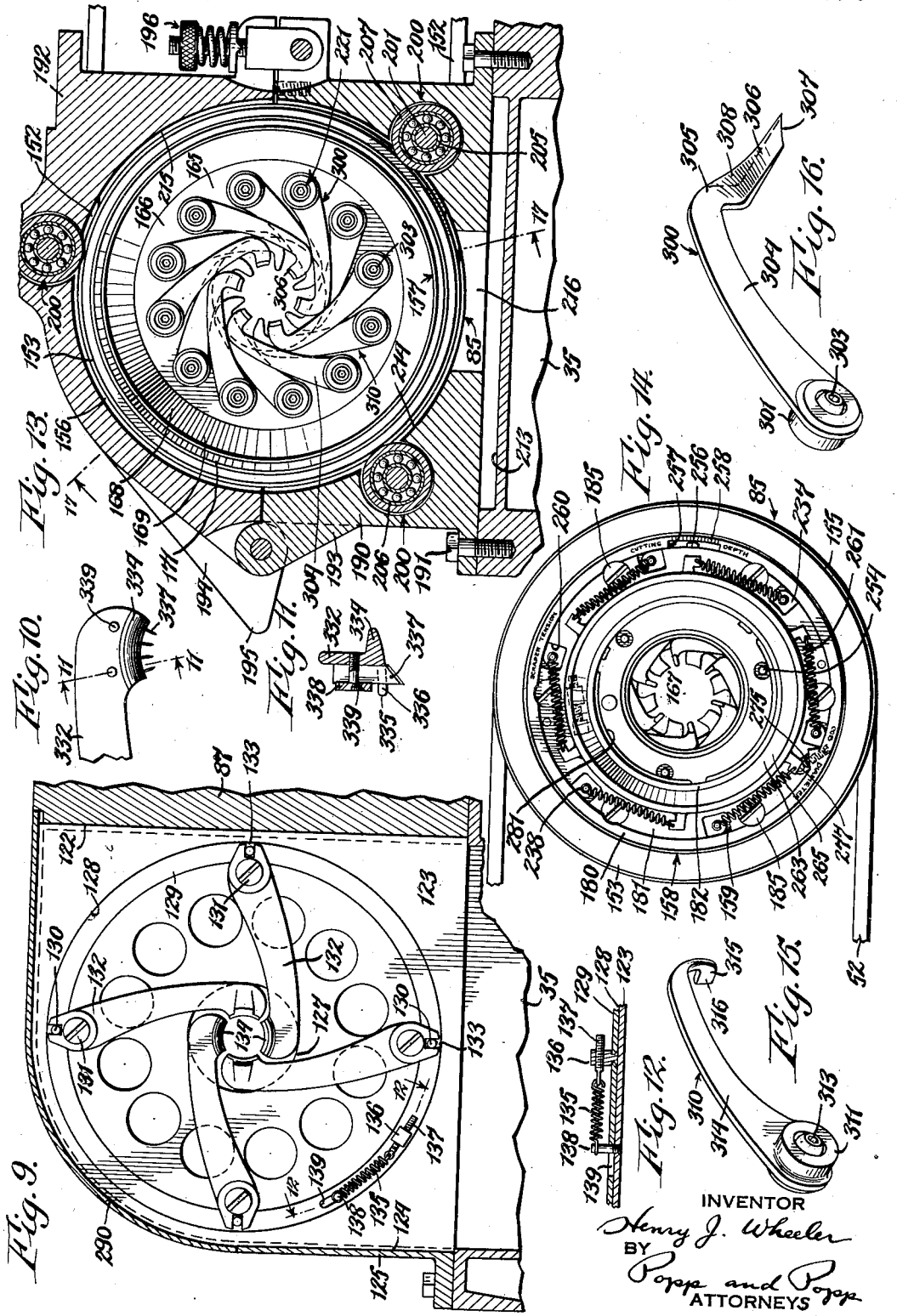
INVENTOR
Henry J. Wheeler
BY
Popp and Popp
ATTORNEYS

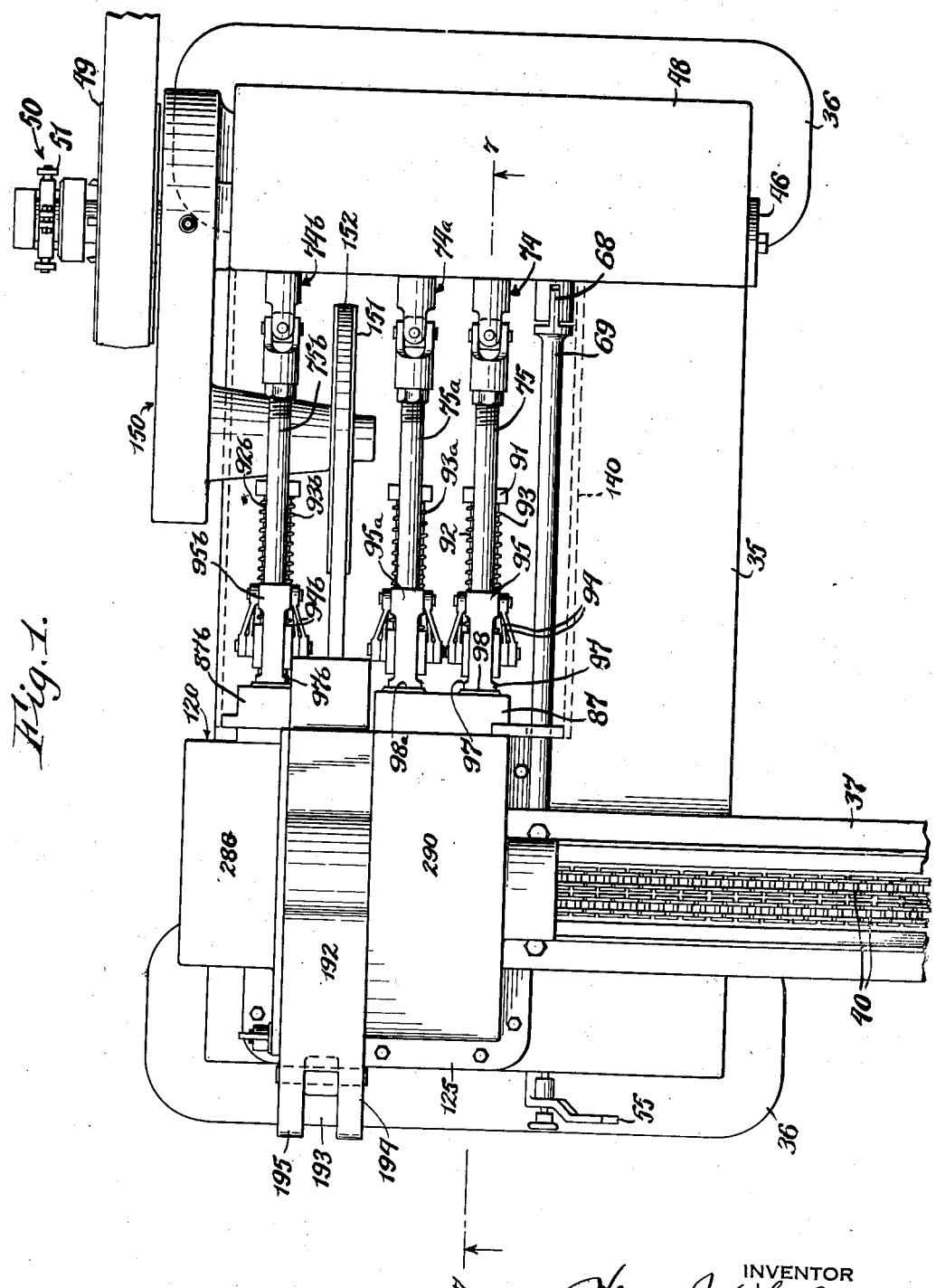

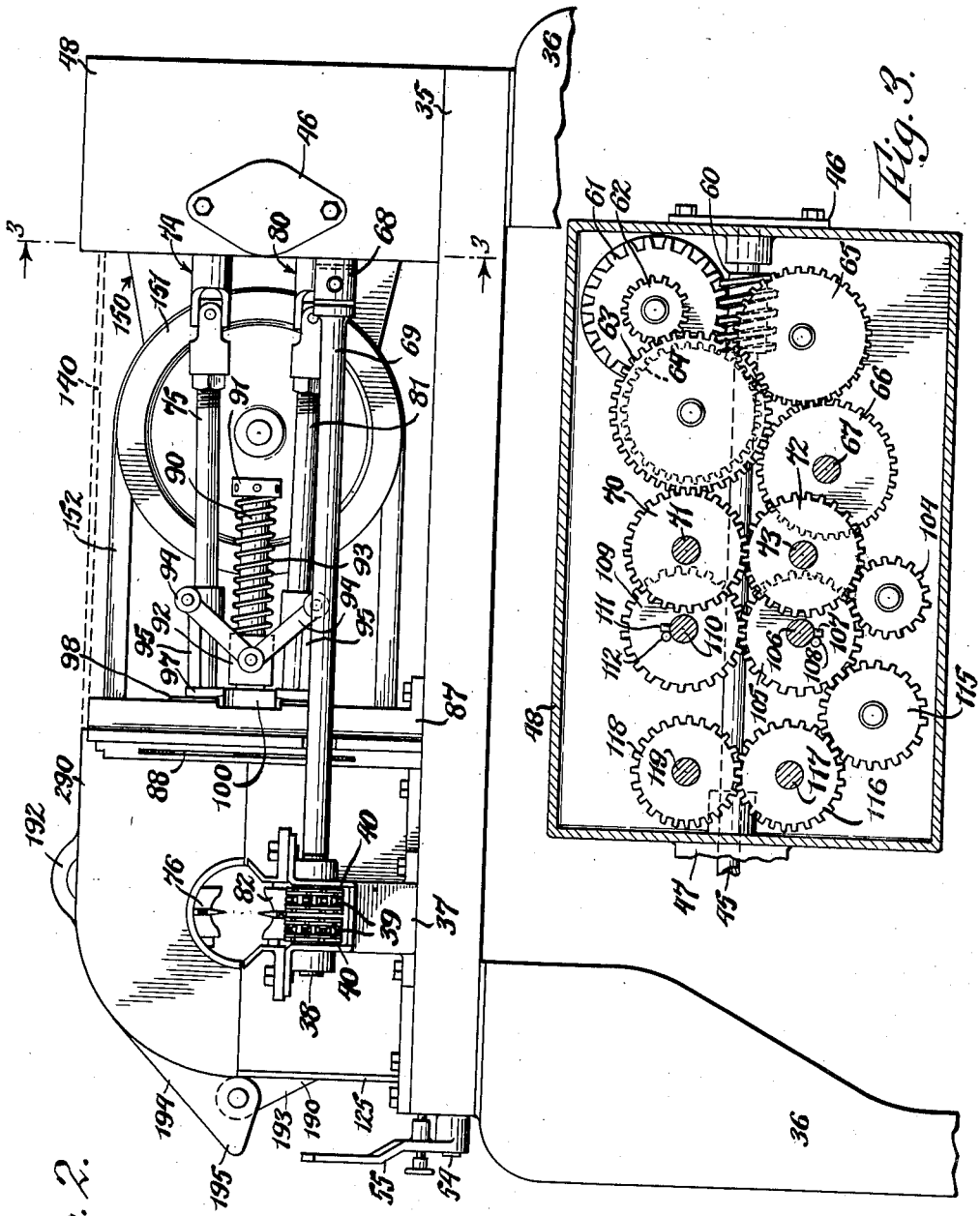

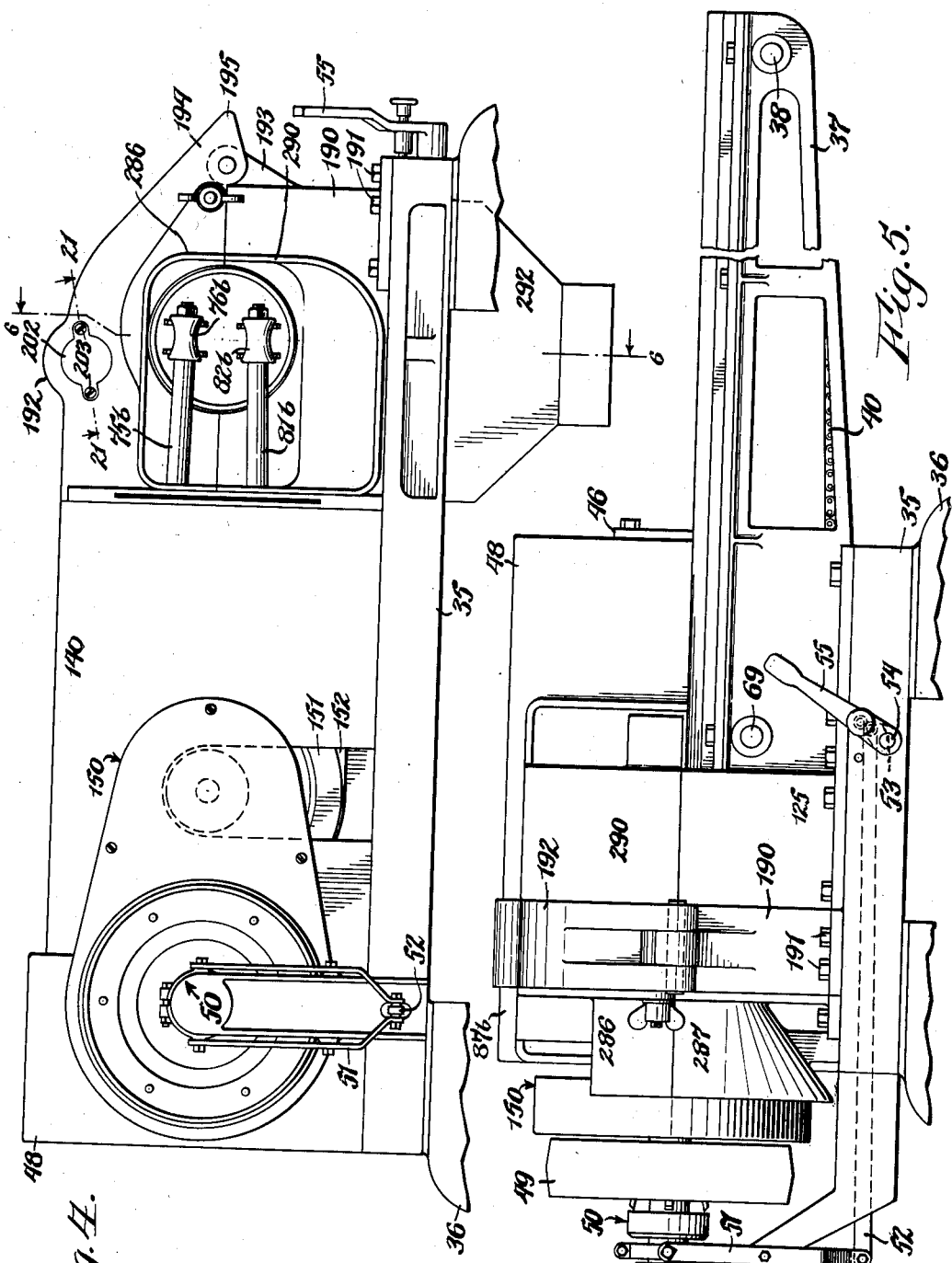

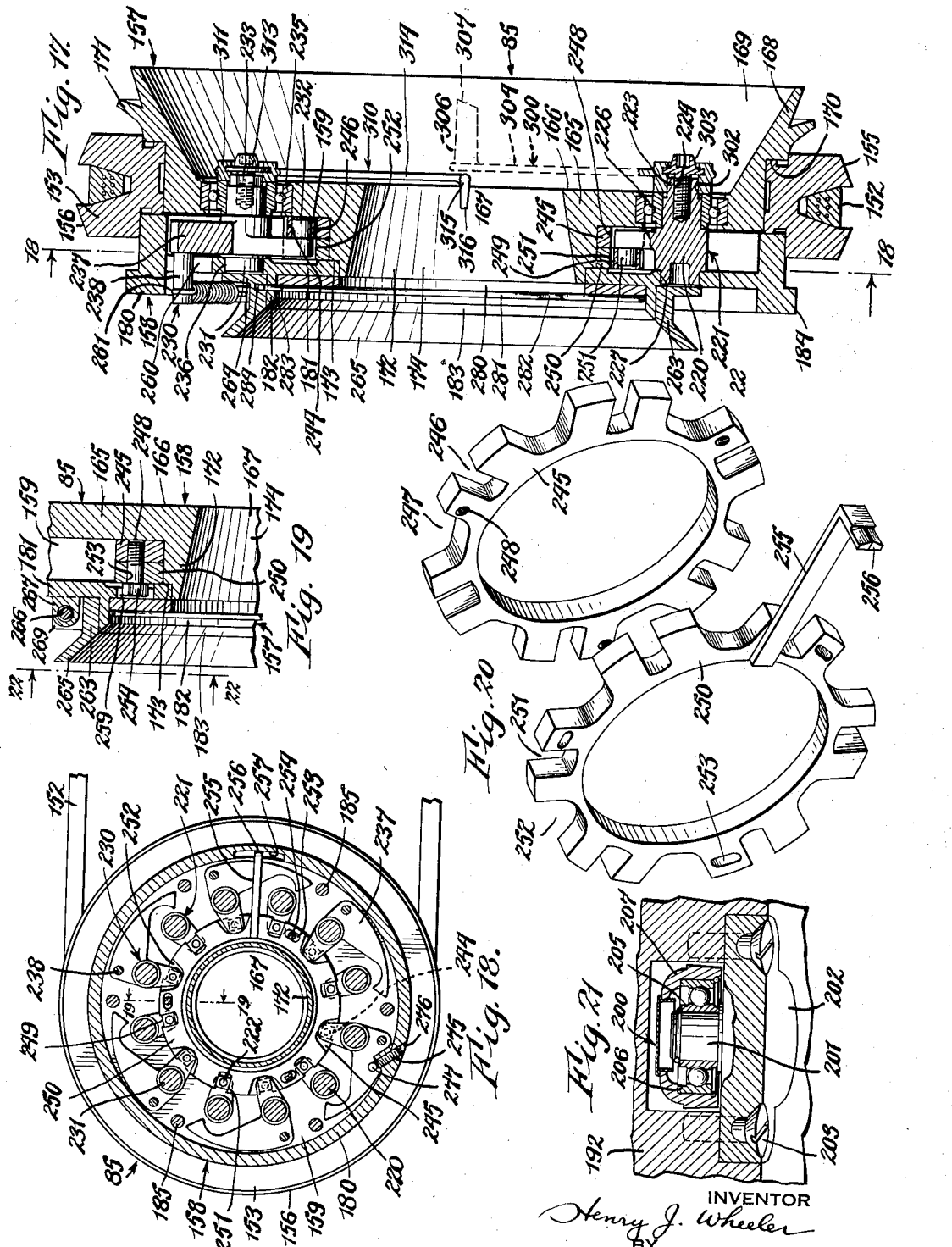

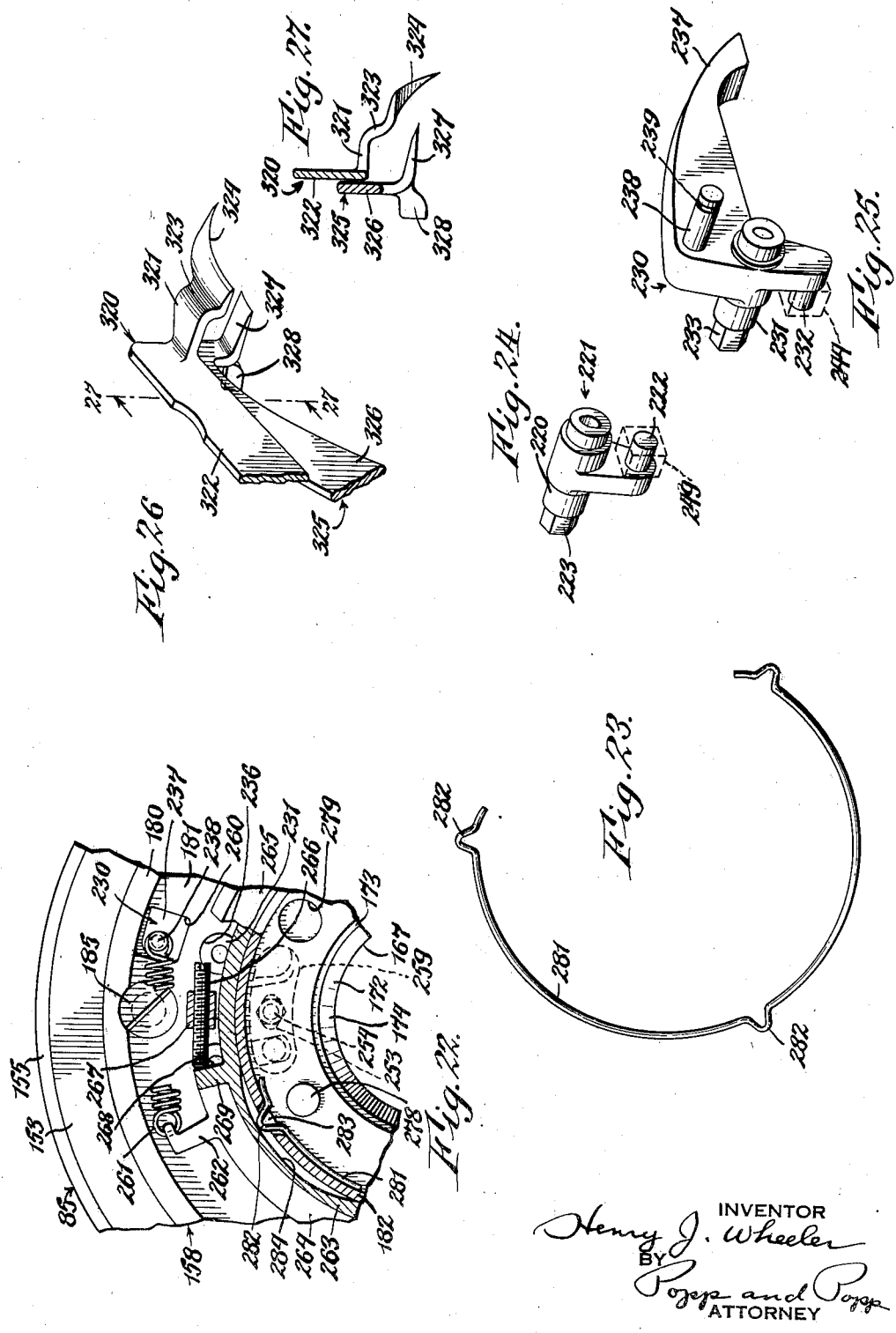

Feb. 6, 1940.  H. J. WHEELER  2,188,934
CORN CUTTER
Filed Nov. 5, 1936  8 Sheets-Sheet 8
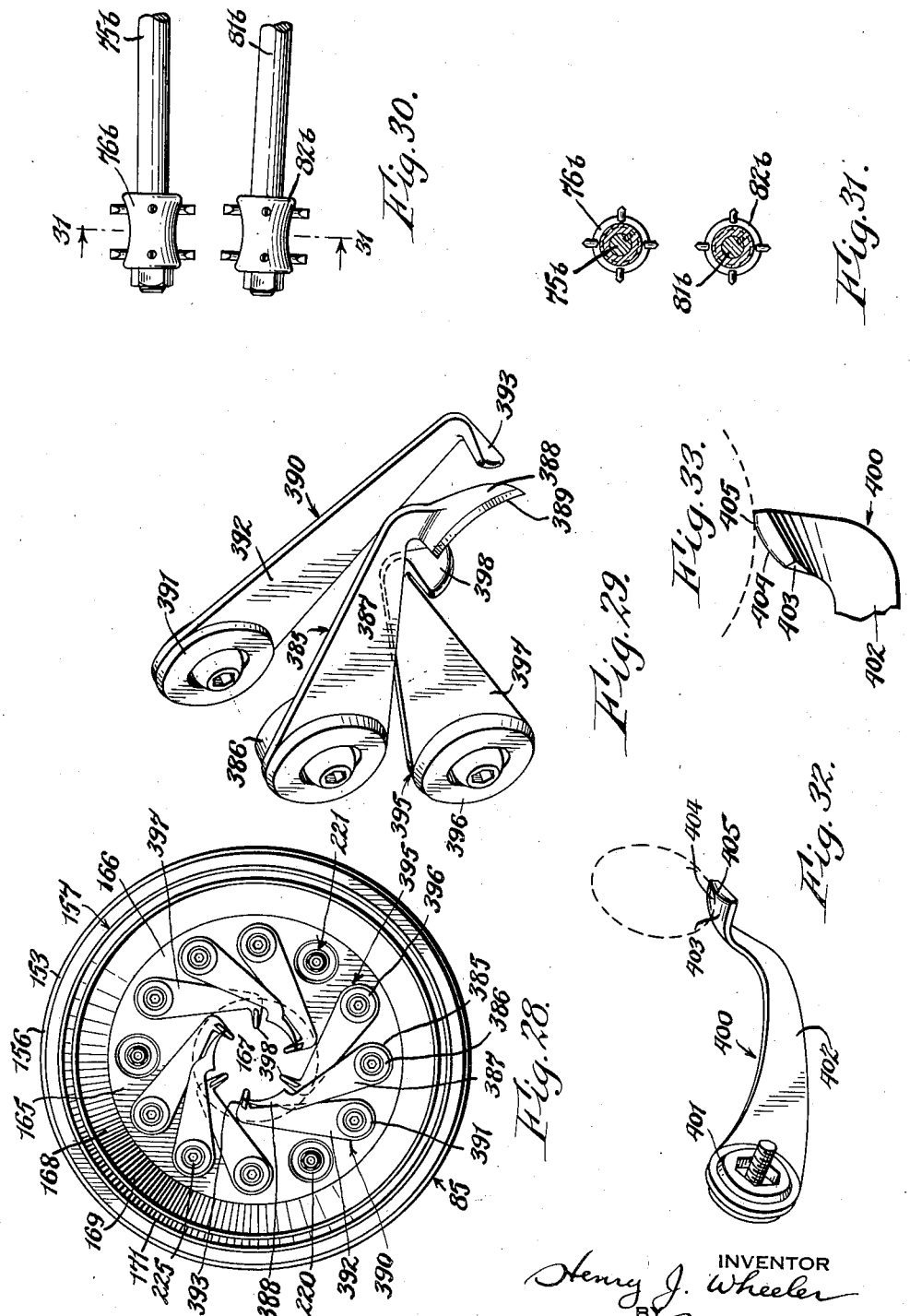
INVENTOR
Henry J. Wheeler
BY
Popps and Popps
ATTORNEY Patented Feb. 6, 1940

2,188,934

UNITED STATES PATENT OFFICE 2,188,934

CORN CUTTER

Henry J. Wheeler, Buffalo, N. Y., assignor to Chisolm-Ryder Company, Incorporated, Niagara Falls, N. Y., a corporation of New York Application November 5, 1936, Serial No. 109,324

21 Claims. (Cl. 130—9)

This invention relates to a corn cutter and more particularly to an improved corn cutter, such as is shown in my prior Patent No. 2,017,931, dated October 22, 1935 and which is adapted for the production of both whole kernel and cream style corn.

One of the principal objects of this invention is to provide a corn cutter which will produce quality-pack whole kernel corn, especially in respect to the depth of the cut kernel, the kernels being cut close to the cob line the entire length of the ear without cutting any of the cob. This produces a full depth kernel with the cut end sealed against leakage of the soft starch from the pulpy or soft interior of the kernel during the cleaning and washing process.

Another object of the invention is to provide such a corn cutter which, by a simple replacement of parts, will cut the kernels off in two slices so that if the kernels cut would be too large they can be removed in two slices.

Another object of the invention is to provide such a corn cutter which, by a simple replacement of the parts, is adapted to the production of cream style corn.

Another important object of the invention is to provide such a machine in which the ears of corn are conveyed axially through a high speed rotary head which comprises, as a self-contained unit, the entire scraping and cutting mechanism, including the cutters and scrapers which rotate in engagement with the kernels and sever the kernels and scrape the cob, the means for adjusting the pressure exerted by the scrapers on the cob, the means for adjusting the minimum spacing of the cutters and scrapers to suit the size of the ears being handled and the means for adjusting the depth of cut of said cutters.

Another object is to render said self-contained rotary head conveniently removable by the simple expedient of mounting it in a series of rollers carried by a two-part holder which can be conveniently opened up and the entire cutter head lifted therefrom. This greatly facilitates cleaning and repair of the rotary cutter head and also renders the mechanism adjacent the rotary cutter head more accessible for cleaning, adjustment or repairs.

Another aim of the present invention is to provide in such a self-contained rotary head a series of guide or scraper arms arranged above the axis of the cutting head adjacent a group of cutters also carried by the rotary head, the groups of cutters and scrapers being adjustable interlocked to permit both the guide arms and the cutters to open and close in unison. The duty of the guide or scraper arms is to grip the cob at the junction of the kernel with the cob and act as a means for opening or closing the cutters as the cutters progress along the tapering ear and hence insure that the cutters cut close to the cob line.

Another object of the present invention is to provide a simple and readily accessible adjustment on said rotary head for conveniently adjusting the interlocked relation of the group of cutters with the group of scrapers so that the depth of cut can be easily adjusted and also so that the machine can be readily adapted to the production of cream style corn in which it is desirable that the cutters remove only the caps from the kernels.

Another purpose of the invention is, in such cutting depth adjustment means, to provide a convenient index provided with a series of graduations so that the cutting depth can be conveniently set as desired without the necessity of resorting to cut and try methods Another aim is to provide in such a self-contained rotary cutter head a single adjustment for simultaneously adjusting the maximum inward movement of both the cutters and the scrapers so that the cutters and scrapers as a single group can be conveniently adjusted to suit corn of different diameters without affecting any of the other adjustments, such as adjustment of the cutting depth relation between the cutters and scrapers.

Another object is to provide, in such a self-contained rotary cutting head, a single means for adjusting the tension imposed upon the cutters and scrapers so that this tension can be adjusted to suit the type and style of corn being cut without affecting any of the other adjustments.

Another object of the present invention is to provide a whole grain style corn cutter in which the kernels cut off by the cutters are discharged forwardly from the rotary cutter head whereas the scrapings and juices removed by the scrapers are thrown off rearwardly from the cutter head, this permitting the separate collection of these two products and providing a high quality main product.

Another object of the present invention is to provide a rotary type corn cutter in which the entire operation upon the ear is accomplished within one chamber and in which the plugging and discharging of chaff and cob with the corn is reduced to a minimum.

Another object is to provide such a cutter which cuts and scrapes successfully any nubbins and eliminates the transfer of short ears from one head to another as is now commonly done.

Another aim of the present invention is to provide a cream style corn cutter which has very high yield of high quality cream style corn, the cobs leaving the machine completely stripped of the interior portions of the kernels and at the same time completely intact, the knives and scrapers being so designed as to avoid bits of cob and chaff being torn from the cob.

Another aim of the present invention is to provide such a corn cutter which is relatively low in cost, reliable and simple in operation, and considering the function which it performs, is composed of few parts which are not liable to get out of order.

Another aim is to provide such a corn cutter which will operate with little power consumption, which is sanitary and easily cleaned and in which the several parts are readily demountable.

Another aim is to provide such a corn cutter which has very high capacity.

Another aim of the present invention is to provide a conveniently removable cutter head which is supported by three bearings, these being so disposed as to center the head, permit its free rotation and counteract the pressure of the feed belt used for driving the head.

Another aim is to provide such a corn cutter which, by a simple substitution of parts, can be used for cutting kernels from blanched ears, the cobs of which are very soft and fragile, the blenching of the ears being customary in producing frozen corn.

Another aim of the present invention is to provide such a rotary corn cutter in which the kernels are smoothly and uniformly discharged from the cutters to the rotary head and in turn immediately discharged into the hopper receiving them without undue crushing or any clogging.

Another purpose of the present invention is to provide, in the holder for the rotary cutter head, means providing a seal which reduces the danger of juices or solid matter entering between the rotary head and the holder and also means providing a drain for any juices which do get between the rotary cutter head and its holder.

Another object of the present invention is to provide a simple and compact gear transmission for operating the conveyer feed chain, pairs of feeding spur wheels and pair of discharge spur wheels, which transmission is also so designed that the ears will be propelled through the machine at high speed and in proper position and spaced relation so as to reduce the danger of the ears becoming caught.

Another aim is to provide a compact, simple and positive mechanism which permits the pairs of spur wheels to separate to accommodate ears of varying diameters and at the same time holds the spur wheels of each pair an equal distance from the axes of the rotary cutter head so that the ears are always conveyed in axial alinement with the head both in being fed thereto and in being discharged therefrom.

Another purpose is to completely isolate said last named spur wheel evening mechanism from the housing through which the ears travel so that there is no danger of contamination with corn juices.

Another object is to provide, in said spur wheel evening mechanism, a simple and positive means for adjusting the minimum spacing of the several pairs of spur wheels so that in running large diameter ears through the machine, the minimum spacing of the spur wheels can be increased thereby reducing the cutting action of the spur wheels on such large ears of corn.

Another object is to provide, in advance of the rotary cutter head a complete centering and guide mechanism consisting of a plurality of guide arms mounted on a conveniently removable plate and jointly providing a guide opening which centers the ears both vertically and horizontally, the plate also carrying the means for insuring the uniform movement of said arms toward and from the center of said guide opening.

In the accompanying drawings:

Fig. 1 is a fragmentary top plan view of a corn cutter embodying my invention.

Fig. 2 is a fragmentary side elevation thereof, viewed from the feeding side of the machine.

Fig. 3 is a section taken on line 3—3, Fig. 2 and illustrating the gearing driving the various parts.

Fig. 4 is a fragmentary side elevation viewed from the discharge side of the machine.

Fig. 5 is a fragmentary front elevation.

Fig. 6 is a fragmentary vertical section through the rotary cutter head and associated feed mechanism, taken on line 6—6, Fig. 4.

Fig. 7 is a fragmentary vertical section, taken on line 7—7, Fig. 1 and illustrating the manner in which the feeding spur wheels adapt themselves to ears of varying diameter.

Fig. 8 is a fragmentary vertical section, taken on line 8—8, Fig. 7.

Fig. 9 is a fragmentary vertical section, taken on line 9—9, Fig. 6 and showing the radially movable inter-connected guide arms which insure centering of the ears before being fed into the rotating cutter head.

Fig. 10 is a fragmentary view similar to Fig. 9 and illustrating a modified form of guide arm in which the arm is provided with a plurality of slitting blades for slitting the kernels before the ear is fed to the rotary cutting head.

Fig. 11 is a section, taken on line 11—11, Fig. 10 showing the manner in which the slitting blades are removably mounted on the slitting arm.

Fig. 12 is a fragmentary section, taken on line 12—12, Fig. 9 and showing the spring for holding the guide arms in engagement with the ears of corn and permitting uniform radial movement thereof.

Fig. 13 is a fragmentary generally vertical section, taken on line 13—13, Fig. 6 and showing the rotary cutter head equipped with knives and scrapers of a form designed to remove the kernels in "whole kernel" form.

Fig. 14 is a vertical transverse section, taken on line 14—14, Fig. 6 and showing a rear face view of the scraper arm tension adjusting mechanism and the mechanism for adjusting the depth of cut.

Fig. 15 is a perspective view of one of the scraper arms mounted on the rotary cutter head and designed for use in conjunction with the cutter arms for removing "whole kernel" style corn.

Fig. 16 is a perspective view of one of the cutter arms for removing "whole kernel" style of corn in conjunction with the scrapers illustrated in Fig. 15.

Fig. 17 is a fragmentary section, taken axially through the rotary cutter head on line 17—17, Fig. 13 and showing the manner of mounting the scraper and cutter arms.

Fig. 18 is a vertical transverse section, through the rotary cutter head, taken on line 18—18, Fig. 17.

Fig. 19 is a fragmentary vertical axial section, through the rotary cutter head, taken on line 19—19, Fig. 18.

Fig. 20 is a perspective view of the two adjusting rings mounted on the rotary cutter head, the relative rotary adjustment of which adjusts the cutter and scraper bars to adjust the depth of cut.

Fig. 21 is a fragmentary, generally horizontal section, taken on line 21—21, Fig. 6 and illustrating the manner in which one pair of roller bearings for the rotary cutter head is rendered removable.

Fig. 22 is a fragmentary vertical view of the discharge side of the rotary cutter heads, with parts broken away, this view being taken on line 22—22, Fig. 19, and showing the manner in which the tension of the cutter and scraper arms is adjusted and the manner in which the adjusting ring and face ring at the discharge side of the rotary cutter head are secured to the head.

Fig. 23 is a side elevation of the wire locking ring which attaches the adjusting ring and the face ring at the discharge side of the rotary cutter head to the head.

Fig. 24 is a perspective view of one of the cranks mounted on the rotary head, the hub of which carries one of the cutter arms, these cranks being driven in unison by a pair of interconnected slotted rings.

Fig. 25 is a perspective view of one of the cranks mounted on the rotary head, the hub of which carries one of the scraper arms, these cranks driving the slotted rings which turn the cutter arm cranks shown in Fig. 24 and being counterweighted to balance the cutter and scraper arms.

Fig. 26 is a fragmentary perspective view of a pair of cutter arms designed to cut the kernels from the cob in two slices.

Fig. 27 is a radial section, taken on line 27—27, Fig. 26.

Fig. 28 is a view similar to Fig. 13, showing the cutter head equipped with "cream style" cutter and scraper arms.

Fig. 29 is a perspective view of a group of "cream style" cutter and scraper arms.

Fig. 30 is a fragmentary side view of the discharge spur wheels and spur wheel shafts used in the production of both "whole kernel" and "cream style" corn, the same type of spur wheels being used as feeding spur wheels in the production of "cream style" corn.

Fig. 31 is a fragmentary vertical section, taken one line 31—31, Fig. 30.

Fig. 32 is a perspective view of one of the scrapers used in cutting corn from blanched ears.

Fig. 33 is a side elevation of the blanched ear scraper shown in Fig. 32 and showing the way in which its head lays against and scrapes the kernels.

The corn cutter embodying the present invention is, by a simple exchange of cutter and scraper or gage arms and feeding spur wheels, as hereinafter described, adapted to cut either whole kernel or cream style corn. In general, the invention comprises means for feeding ears of husked corn in proper alinement axially through a rotating head which carries a plurality of gage or scraper and cutter arms, the edges of which engage the kernels to sever and scrape them. Means are provided for conveniently adjusting the spring pressure imposed on these arms and their limit of movement and means are also provided for conveniently adjusting the positions of the scrapers and cutters relative to one another to adjust the depth of cut. The cutter head is also so designed that it is compact and adequately sealed and is so mounted as to be conveniently removable and so as to run true at high speeds, thereby increasing the capacity of the corn cutter.

*The ear conveying and centering mechanism*

The corn cutter is shown in the accompanying drawings as mounted on a pedestal or table having a top 35 supported by end standards 36. To the pedestal top is bolted a feeding trough 37 which projects outwardly from the pedestal. In the outer end of this feeding trough is journalled a shaft 38 which carries a pair of sprockets 39. These sprockets support a pair of feed chains 40 of any usual and well known form, the other ends of these feed chains being carried and driven by a pair of sprockets 41 and being arranged to discharge an ear of corn, placed lengthwise in the trough 37, between the housed feeding spur wheels of the corn cutter.

The driving mechanism of the corn cutter comprises a main drive shaft 45 which is suitably journalled in bearings 46, 47 mounted in the walls of a gear case 48 at the rear of the machine, this main drive shaft being driven from a pulley 49 through a clutch 50. As best shown in Fig. 5, in order to render the clutch conveniently operable from the front, the arm 51 actuating the clutch is connected to a horizontal bar or link 52 which extends under the bed or top 35 and connects with a crank arm 53 on a rock shaft 54. This rock shaft is suitably journalled in the bed 35 and extends fore and aft through the front wall of the bed, an operating hand lever 55 being secured to the rock shaft in front of the cutter. It will therefore be seen that by throwing the hand lever 55, the clutch 50 will be actuated to apply power to the main drive shaft 45 or to render the cutter inoperative.

Within the gear case 48, as best shown in Fig. 3, the main drive shaft 45 carries a worm 60 which drives a worm wheel 61 loosely mounted on a short shaft within the gear housing and carrying a pinion 62 driving a gear wheel 63 loosely mounted on a second short cross shaft. This gear wheel 63 carries a gear 64 which drives an idler gear 65. The idler gear 65 drives a gear 66 which is fast to a shaft 67 journalled in the gear casing and driving, through a universal 68, the shaft 69 on which the drive sprockets 41 of the main feed chains 40 are mounted. It is therefore apparent that a positive drive is provided between the driving pulley 49 and the ear feed chains 40.

Upon leaving the feed chains 40, the ears of corn are caught between two spur wheels which are driven and held centered with reference to the axis of the rotary driving head by mechanism which is preferably constructed as follows:

As illustrated in Fig. 3, the gear 63 meshes with a gear 70 which is fast to a shaft 71 journalled in the gear case 48. The gear 70 meshes with an equal sized gear 72 directly thereunder which is fast to a shaft 73 also journalled in the gear case 48. As best shown in Fig. 7, the upper shaft 71, through a universal 74, drives an upper spur wheel shaft 75 which carries a spur wheel 76, the center of which is in the same vertical plane as the axis of the ears discharged by the feed chains 40. The lower shaft 73, through a universal 80, drives a lower spur wheel shaft 81 carrying a lower spur wheel 82 arranged directly under the upper spur wheel 76.

The ear of corn discharged endwise by the conveyer feed chain 40 is caught between the spur wheels 76 and 78 which propel it toward the rotary cutter head indicated generally at 85. In order to permit the spur wheels to open and close in unison toward and from a common center to adapt themselves to ears of different diameters and still maintain the ear of corn axially in line with the rotating cutter head, a mechanism is provided which is preferably constructed as follows:

The shafts 75 and 81, as best shown in Figs. 7, extend through vertical slots 86 provided in a bracket 87 which is mounted on the bed or table 35 and forms the rear wall of a housing for the cutting mechanism. Through these slots a vertical guideway or slot 88 extends, this guideway serving to guide the edges of two thin metal slides 89 which surround the shafts 75 and 81 and rise and fall therewith, at all times completely blocking or closing the slots 86. The purpose of the slides 89 is to prevent corn juices from splattering through the otherwise open slots 86 onto the shaft evening mechanism in rear of the bracket 87 and hence rendering it easier to keep the machine in a clean and sanitary condition.

Projecting rearwardly from the wall 87 between the two slots 86 is a fixed rod 90 the outer end of which is threaded and fitted with a nut 91. On this rod 90 is slidingly fitted a sleeve 92 which is urged forwardly by a helical compression spring 93 surrounding the rod 90 and interposed between the sleeve 92 and the nut 91. This sleeve is connected by a pair of vertical toggle links 94 with a pair of skeleton sleeves 95 each loosely mounted on the corresponding shaft 75 and 81. The front end of each of these skeleton sleeves 95 is guided in a vertical guideway 96 provided in the rear side of the bracket 87 around each of the slots 86. The forward movement of the sleeves and links 92—95 under the influence of the spring 93 is limited by stop shoulders or ribs 97 provided on opposite sides of the front end of each skeleton sleeve 95 and engaging raised slideways 98 provided on the rear side of the bracket 87 on opposite sides of the slots 96, as best shown in Fig. 8, the parts therefore being always held in the forward position indicated in Fig. 7. It will be seen that with this toggle link mechanism, if the lower shaft 81 should be forced downwardly, the lower toggle link 94 would draw the sleeve 92 rearwardly thereby throwing the upper toggle link 94 rearwardly and raising the upper skeleton sleeve 95 and upper spur wheel shaft 75. The toggle links therefore always keep the upper and lower feeding spur wheels equally spaced from the axis of the rotating cutter head 85.

The spur wheels 76 and 82 are held at a fixed minimum spacing by a rotatable plate 100 which can also be turned to increase the minimum spacing of the spur wheels. This plate, as best illustrated in Fig. 8, is loosely mounted on the rod 90 between the wall 87 and the sleeve 92. The plate is of elongated form and is provided with opposite rounded cam corners 101. The upper and lower sides of this plate are engaged by the upper and lower skeleton sleeves 95 and it will therefore be seen that when the plate is turned so that its smaller dimension is vertical the normal spacing of the spur wheels 76 and 82 is small, whereas when the plate is turned to the position shown in Fig. 8 the normal spacing of these spur wheels is increased. When a run of small diameter ears is being handled the plate 100 is set so that its long dimension extends horizontally so that the spur wheels 76 and 82 are normally closely spaced and firmly engage the thin ears. When a run of thick ears is being handled, the plate 100 is turned to the position shown in Fig. 8, in which the normal spacing of the spur wheels 76 and 82 is increased and the thick ears are not required to spread them so far. Possible injury to thick ears of corn because of the necessity of spreading the spur wheels 76 and 82 an undue distance is thereby avoided.

The gear 72 (Fig. 3) meshes with an idler pinion 104 which also meshes with a gear 105 loosely mounted on a shaft 106. In order to effect a drive from this gear to this shaft in one direction and at the same time permit the shaft to pull ahead of the gear, a radial pin 107 is provided in the shaft which engages a pin 108 projecting outwardly from the corresponding face of the gear 105. The gear 105 meshes with an equal sized upper gear 109 loosely mounted on a shaft 110 which is compelled to turn with the gear by a pin 111 on the shaft in the path of a pin 112 on the gear, this pin permitting this shaft to also run ahead of the gear 109 for a purpose which will presently appear.

The upper shaft 110, through a universal 74a, drives an upper spur wheel shaft 75a carrying a spur wheel 76a. The lower shaft 106, through a universal, drives a lower spur wheel shaft 81a and a spur wheel 82a. These spur wheels 76a and 82a pick up the ears of corn from the first pair of spur wheels 76 and 82. These spur wheels are floatingly mounted and compelled to move in unison from a common center by a mechanism identical with the mechanism surrounding the shafts 75 and 81 and shown in Figs. 7 and 8, this description not being repeated, the same reference numerals being employed and distinguished by the suffix a.

The gear 105 (Fig. 3) drives an idler gear 115 which in turn drives a lower gear 116 fast to a shaft 117 journalled in the walls of the gear box 48. This gear 116 drives an equal sized gear 118 arranged immediately thereover and fixed to a shaft 119 also journalled in the side walls of the gear box 48. The upper shaft 119, through a universal 74b, drives an upper spur wheel 75b which extends through a vertical slot 86b in a bracket 87b and into a hood 120 forming the discharge chute for the cobs and scrapings and carries an upper ear discharge spur wheel 76b. The lower shaft 117, through a universal, drives a lower spur wheel shaft 81b carrying a lower discharge spur wheel 82b located in the discharge hood 120. The pair of discharge spur wheels are arranged on the discharge side of the rotary cutter head 85 and function to discharge the cob from the machine. As best illustrated in Figs. 30 and 31, it will be seen that the spur wheels 76b, 82b are of a somewhat different type from the spur wheels 76 and 82. Instead of having a single row of spurs, the discharge spur wheels 76b, 82b have a double row of spurs. The double row of spurs grip the cob more securely and hence are used to discharge the cob regardless of the style of corn being cut. However, the double row of spurs have a greater puncturing and tearing effect and are hence not used to feed the kerneled ears of corn to the rotary head in producing whole kernel corn although they are preferably so used in producing cream style corn as hereinafter described.

It will be noted (Fig. 3) that the pair of gears 116 and 118 are smaller than either of the pairs of gears 105, 109 or 70, 72. Therefore the discharge spur wheels 76b and 82b are always driven at a higher rate of speed than the pairs of feeding spur wheels 76, 82 and 76a, 82a. This is to accelerate the rate of speed of the ear as it is passing through the rotary cutter head 85 and insure that the ears pass through the rotary cutter head in spaced relation even though they have been carelessly placed in the feeding trough 37 in the overlapping relation. It will be noted that an ear of corn bridging the pairs of spur wheels 76a, 82a and 76b, 82b will not be torn and mutilated by reason of the two speeds at which these two pairs of spur wheels are normally driven. This is because the pins 107, 108 and 111, 112 (Fig. 3) included in the drive of the feeding spur wheels 76a and 82a permit these feeding spur wheels to run ahead of their drive. Consequently, when the advance end of the ear is engaged by the pair of discharge spur wheels 76b, 82b and its movement accelerated it forms a driver for the feeding spur wheels 76a and 82a and draws the pins 107 and 111 away from the drive pins 108 and 112, respectively. As soon as the rear end of the ear is released from the spur wheels 76a and 82a, the pins 108 and 112 catch up with the pins 107 and 111 and re-establish the normal drive for the feeding spur wheels 76a and 82a.

The discharge spur wheels 76b and 82b are compelled to move in unison toward and from a common center by a mechanism identical with the mechanism surrounding the shafts 75 and 81 and shown in Figs. 7 and 8, and hence this description is not repeated, the same reference numerals being employed and distinguished by the suffix b.

In order to guide the ears of corn axially into the rotary cutter head even though received improperly by the first pair of feeding spur wheels 76, 82, movable guide fingers are mounted in a removable plate and engage the ear to compel it to progress in proper position, this mechanism being as follows:

Between the pairs of feeding spur wheels 76, 82 and 76a, 82a, the bracket 87 in rear of these spur wheels is provided with a vertical groove 122 (Fig. 9) which receives the rear edge of a removable upright plate 123 extending across the path of the ears through the machine. The front edge of this plate is supported in a vertical groove 124 in a bracket 125 forming a part of the front wall of the housing for the conveying mechanism. It will therefore be seen that the plate 123 can be readily removed by sliding it upwardly in the grooves 122 and 124.

At its center this plate 123 is provided with an opening 127 through which the ears pass. On the face opposing the approaching ears, this plate, as best shown in Figs. 6 and 9, is provided with a circular groove 128 in which is set a ring 129 capable of rotating in this groove. This ring carries a plurality of evenly spaced projecting pins 130, four being shown, and radially inward from each of these pins, a pivot screw 131 is carried by the plate 123. Each of the pivot screws 131 carries a guide arm 132, one end of which is slotted, as indicated at 133, to engage the corresponding pin 130 and move therewith. The other end of each of the guide arms 132 is formed to provide a guide head 134 which is tapered or set at an angle so that the groups of heads 134 form a tapering guideway for receiving the end of each ear of corn, the ear, by virtue of this taper, opening up the arms in passing through. Since all of the arms 132 are tied together by the guide ring 129 it will be seen that the movement of any of them away from the center moves all of the others a corresponding distance outwardly. Therefore the ear of corn in passing through the guide arms is brought to a properly centered position if it is not already in such position.

The heads 134 of all of the arms 132 are yieldingly held in a closed or contracted position by a spring 135 which, as best shown in Figs. 9 and 12, is adjustably connected to a lug 136 on the ring 129 by a screw 137, the other end of the spring 136 connecting with a pin 138 secured to the plate 123 and extending through a slot 139 in the ring 129. It will be seen that the spring 135 draws the ring 129 in the direction in which the heads of the guide arms are held contracted and that the pin 138 in the slot 139 serves as a stop to limit the movement of the ring and hence fix the contraction limit of the arms 132 so that their heads 134 never engage one another.

It will be seen that the plate 123 can be readily slid upwardly in the grooves 122 and 124 and lifted free of the machine, and as this plate carries all of the guide arm mechanism it is apparent that this feature greatly facilitates keeping the machine in repair and in a clean and sanitary condition since this mechanism can be conveniently removed and cleaned and repaired and by its removal the other mechanism is rendered more accessible for cleaning and repairs.

The spur wheel shafts 75, 81, 75a, 81a, 75b and 81b and the shaft 69 for driving the feed chains 40 are preferably housed within a U-shaped housing 140 which extends from the gear case 48 to the walls 87 and 87b.

*The rotary cutter head*

The rotary cutter head is driven from the main drive shaft 45 which, through a transmission housed within a housing 150, drives a pulley 151 having a V-rim. A V-belt 152 connects this pulley with the drive rim 153 of the rotary cutter head indicated generally at 85. As best shown in Fig. 17, this rim is provided with a V-shaped groove to receive the drive belt 152 and the peripheral faces 155 and 156 of the rim on opposite sides of its V-groove are of outwardly facing beveled or conical form for a purpose which will presently appear.

The main body of the cutter head consists of two annular sections 157 and 158 bolted together and clamping the rim 153 therebetween and forming an internal annular chamber 159 in which the operating mechanism for the cutters and gages or scrapers is located. The front section 157 of the head or that facing the feed end of the machine is formed to provide a central disk-shaped portion 165 having a vertical flat front face 166 and formed to provide a central opening 167 through which the ears of corn are axially propelled by the feed and discharge spur wheels. Around the disk-shaped central portion 165, the front section is formed to provide a rim 168 on which the drive rim 153 is seated and which extends forwardly from the disk-shaped central portion and flares outwardly beyond the drive rim to provide a relatively broad outwardly flaring, conical discharge face 169. The portion of the rim 168 which extends beyond the drive rim 153 is formed to provide a shoulder 170 against which the drive rim 153 is clamped and terminates in a relatively thin edge. On the outer periphery of this rim 168, between its edge and the drive rim 153, the rim 168 is formed to provide an outwardly projecting flange 171 which flares or inclines toward the feed end of the machine and forms part of a seal as will be more fully described. Around the opening 167, the front section 157 of the cutter head is formed to provide a hub or flange 172 which projects rearwardly from the disk-shaped central portion 165 and is stepped to provide an external annular shoulder 173 at its rear end. The inner face 174 is of rearwardly flaring or conical form. The kernels are cut from the ears before passing through the opening 167 and it will therefore be seen that the plane of the face 166 forms a dividing plane for the cut materials thrown out by the rotary action of the head. Those materials which are thrown out in advance of this plane strike the forwardly flaring conical face 169 of the front section 157 and are discharged at the front side of the cutter head and those materials thrown out in rear of this plane strike the rearwardly flaring conical face 174 of the front section 157 and are discharged at the rear side of the cutter head.

The rear section 158 of the rotary cutter head comprises a cylindrical rim 180 and an integrally formed disk-shaped web 181 extending inwardly from this web. The cylindrical rim 180 projects both forwardly and rearwardly from the web 181 and clamps against the rear side of the drive rim 153, as best shown in Fig. 17. The web 181 is provided with a circular opening through which the ears of corn are propelled and the margin of the web around this opening seats on the stepped shoulder 173 provided at the rear of the hub or flange 172 of the front section 157. Between this inner margin seating on the shoulder 173 and the cylindrical rim 180 a rearwardly projecting circular flange 182 is provided, the outer end of which is beveled, as indicated at 183, for a purpose which will presently appear. The cylindrical rim 180 is also provided with an annular peripheral square sealing bead 184 at its rear end for a purpose which will presently appear.

The front section 157 and the rear section 158 are removably secured together to clamp the driving rim 153 therebetween by a plurality of screws 185, as best shown in Figs. 6, 18 and 22, six of such screws being preferably employed.

The entire cutting and scraping mechanism is carried by the rotary cutter head 85 and to render the entire head and its contained cutting and scraping mechanism readily removable, the head is mounted in rollers in a two part separable holder which upon being opened permits the entire cutter head to be lifted out. This, of course, greatly facilitates the cleaning and repair of the cutter head and also renders the conveyer mechanism more accessible for cleaning and repairs. The lower half 190 of the two part holder for the rotary cutter head consists of a casting bolted to the top of the table or bed as indicated at 191, and is, as best illustrated in Fig. 13, semi-circularly recessed to receive and conform to the lower half of the rotary cutter head 85. To the lower half 190 of the holder for the rotary cutter head is hingedly connected the upper half 192 of this holder, the underside of this upper half of the holder being semi-circularly recessed to closely embrace the upper half of the rotary head 85.

The hinge connection between the two halves 190 and 192 of the rotary cutter head holder, as best shown in Fig. 13, consists of an ear 193 projecting outwardly from the lower half 190 of the rotary cutter head holder and embraced by a pair of ears 194 projecting outwardly from the upper half 192 of the holder, these ears being connected by a horizontal pivot pin. The ears 194 are also preferably extended to form stops 195 which support the upper half of the holder when it is swung to expose the rotary cutter head. At the side opposite the hinge connection between the two halves of the rotary cutter head holder, the two halves are held together by a latch 196 of any suitable form which preferably includes a spring for exerting a yielding action in holding the two halves closed.

The rotary cutter head is supported by three pairs of ball bearing rollers 200. Two pairs of these rollers are mounted in the lower half holder section 190 and one pair of these rollers are mounted in the upper half holder section 192, thereby to provide the equivalent of a three point support for the rotary cutter head. These bearings engage the periphery of the drive ring 153 of the rotary cutter head 85 and hence, as best shown in Fig. 13, the pairs of rollers are preferably so disposed as to oppose the tension of the V-belt 152 which drives the rotary cutter head. To this end the upper pair of bearings mounted in the upper half holder section 192 is located on that side of the vertical center line of the rotary cutter head from which the stretches of the V-belt extend or toward the rear of the machine. As each of these rollers is mounted and constructed in the same manner, a description of one will be deemed to apply to all six.

The rollers 200 engage the opposite beveled faces 155 and 156 of the drive rim 153 to hold the rotary cutter head centered and each roller is therefore set at an angle to the axis of rotation of the cutter head and parallel with the beveled face which it engages. Each roller is mounted on a stud 201 formed integrally with a supporting block 202 which is set into an angular recess in the rotary cutter head holder and secured therein by screws 203 or in any other suitable manner. The outer face of each of the blocks 202 is preferably disposed flush with the adjacent face of the cutter head holder and hence is at an angle to the stud 201.

The stud 201 carries the inner race 205 of a ball bearing, the outer race 206 of which carries the roller 207, which engages the corresponding angular or tapered surfaces 155 or 156 of the drive rim 153 of the rotary cutter head. It will be noted that the periphery of each roller 207 is slightly tapered so that the peripheral speed at each side of the roller is the same as the corresponding peripheral speeds of the surface which the roller engages. This avoids unnecessary wear which would otherwise be occasioned by the variation in peripheral speeds caused by the beveled form of the surfaces 155, 156 of the rotary cutter head.

By the provision of the rollers 200 for supporting the cutter head, by its periphery, in the two part holder 190, 192, it will be seen that on opening the two part holder, the entire head can be lifted from the machine and disconnected from the belt. The cutting, scraping, gaging and adjusting mechanisms carried by the rotary head are therefore rendered conveniently accessible.

It will also be noted that by arranging the rollers 200 in pairs at an angle to one another they center the rotary head and by mounting these rollers on studs on the removable blocks 204 the rollers are conveniently removable from the exterior of the two part holder.

The material cut and scraped from the ears of corn by the hereinafter described cutting and scraping mechanism carried by the rotary cutter head, includes juices and scrapings. To prevent such juices and scrapings from lodging between the rotary cutter head and its two part holder, sealing means are provided which tend to prevent the entrance of the juices between these parts and means are also provided for draining such juices as do enter.

As best shown in Fig. 6, the semi-circularly recessed portions of the two part rotary cutter head holder closely embrace the rotary head and generally conform in cross section to the outline of the head. At the inlet side of the head, the lower holder section 190 is formed to provide a semi-circular channel 210 and the upper holder section 192 is formed to provide a similar channel 211 forming a continuation thereof. These channels receive the angularly disposed sealing flange 171 which picks up any juices, and through centrifugal action, creates a liquid seal in the circular channel 210, 211. The continuous escape of such juices from the channel 210, 211 is provided by a drain 212 leading to a discharge trough 213 formed in the bed 35 of the machine.

At its center the lower holder section 190 is formed to provide a deeper semi-circular channel 214 which closely fits around the sides of the drive rim 153 of the drive head. The upper holder section 192 is formed to provide a similar channel 215 forming a continuation of the channel 214 and the circular channel 214, 215 is drained into the trough 213 by a duct 216. At the discharge side of the rotary cutter head, the lower holder section 190 is formed to provide a shallow and narrow semi-circular channel 217 which closely fits the square bead 184 of the rotary cutter head. The upper section 192 is similarly formed to provide a channel 218 forming a continuation of the channel 217 and the circular channel 217, 218 is drained into the trough 213 by a duct 219. The three circular channels formed in the interior of the rotary cutter head holder and receiving the peripheral projections 171, 153 and 184 of the head provide a seal which catches any juices entering between the head and the holder and discharges them into the trough 213. Any solids are carried along with the juices so that there is no danger of clogging.

The cutting and gaging or scraping mechanism carried by the rotary cutter head is constructed as follows:

The rotary cutter head 85 carries six cutter arms each of which is mounted on the hub 220 of a crank 221, the crank arm of which, as best shown in Fig. 24, carries a pin 222 projecting in the direction of the line of movement of the corn. The hub 220 at the opposite side of the crank arm is of hexagonal form, as indicated at 223, and is provided with an axial threaded screw hole 224 (Fig. 17). The hub 220 of each crank arm is supported, between the hexagonal end 223 and the crank arm, by a ball bearing 226 which is set into the disk-shaped central portion 165 of the front section 157 of the rotary cutter head. The opposite end of each hub 220 is journalled in the web 181 of the rear section 158 of the rotary cutter head, as indicated at 227. The six cranks 221 are mounted in spaced annular arrangement around the rotary cutter head and their axes are parallel with the axis of the cutter head. The crank arms and pins 222 are disposed in the annular chamber 159 formed between the cutter head sections 157 and 158.

Between each of the cranks 221 which carry the cutter arms is located a crank 230 on the hub 231 of which is mounted a scraper arm. As best shown in Fig. 25, the crank arm of each of the cranks 230 carries a pin 232 which projects in the opposite direction from the pins 222 of the cranks carrying the cutter arms. The hub 231 on the same side of the crank arm is of hexagonal form, as indicated at 233, and is provided with an axial threaded screw hole. The hub 231 of each crank arm 230 is supported, between its hexagonal end 233 and its crank arm by a ball bearing 235 which is set into the disk-shaped central portion 165 of the front section 157 of the rotary cutter head. The opposite end of each hub 231 is journalled in the web 181 of the rear section 158 of the rotary cutter head, as indicated at 236. On the side opposite its crank arm each of the cranks 230 may be provided with a counterweight extension 237, this counterweight carrying a pin 238 having a groove 239, which pin extends in the opposite direction from the pin 232. The six cranks 230 are mounted in spaced annular arrangement around the rotary cutter head, alternating with the cranks 221 carrying the cutter arms, and their axes are parallel with the axis of the cutter head. The crank arms and counterweights of the cranks 230 are disposed in the annular chamber 159 formed between the cutter head sections 157 and 158.

The cranks 230 carrying the scrapers are compelled to turn in unison by a connecting ring 245 which is rotatably mounted on the rearwardly projecting flange or hub 172 immediately in rear of the disk-shaped central portion 165 of the front cutter head section 157. For this purpose the ring 245 is provided with six radial slots 246 each of which slidingly receives a small sliding block 244 in which is journalled the forwardly projecting pin 232 of the corresponding scraper arm crank 230. The purpose of interposing the sliding blocks 244 between the pins 232 and the radial slots 246 is to provide a full bearing surface instead of the line contact which would exist if the pins engaged the sides of these slots directly. There is therefore less wear at these points by using the sliding blocks. Between these slots 246 the ring 245 is cut away to provide broad recesses 247, these recesses receiving and providing clearance for the crank arms of the cranks 221 carrying the cutter arms so that the ring 245 and the cranks 221 can move the necessary limited extent without interfering with one another. At spaced intervals this ring is provided with screw holes 248, three being shown.

Arranged against the rear face of the ring 245 is a somewhat similar rotary ring 250 for compelling the cranks 221 carrying the cutting arms to rotate in unison, having for this purpose six radial slots 251 receiving small sliding blocks 249 in which are journalled the rearwardly projecting crank pins 222 of the cranks 221 carrying the cutter arms. Between the slots 251, the ring 250 is cut away to provide broad recesses 252 around the crank arms of the cranks 230 which carry the scraper arms so that both the cranks 230 and the ring 250 can move the necessary limited extent without interfering with one another. Registering with the screw holes 248 of the ring 245, the ring 250 is provided with slots 253 which are concentric with the axis of the rotary cutter head. Adjusting screws 254 (Fig. 19) pass through these slots 253 into the screw holes 248 and when tightened secure the two rings 245 and 250 together so that they rotate in unison. The slots 253 permit of adjusting the relation of the rings to vary the depth of cut. This adjustment is preferably indicated by an arm 255 which carries a rearwardly projecting pointer 256, this pointer projecting through a recess 257 provided in the rim 180 of the rear cutter head section 158, as best shown in Figs. 14 and 18. As shown in Fig. 14 this pointer 256 traverses a graduated scale 258 on this rim 180 which scale indicates the depth of cut at any setting of the two rings. To render the heads of the screws 254 readily available for the adjustment above described, the web 181 of the rear cutter head section 158 is provided with slots 259 registering with these screws, as indicated in Figs. 19 and 22, and through which the screws can be loosened and tightened.

The connected rings 245 and 250 are yieldingly urged in the direction in which the cutters and scrapers actuated by these rings are in their contracted position. For this purpose the six pins 238 on the counterweights 237 of the scraper arm cranks 230 project rearwardly through a corresponding number of openings 260 in the web 181 of the rear cutter head section 158, as best shown in Figs. 14 and 17. At the outer end of each pin 258, the end of a tension spring 261 is caught in the groove 239 and the other end of each of these springs 261 is anchored in a finger 262 projecting radially outward from a rotatable tension adjusting ring 263, as best shown in Fig. 22. This tension adjusting ring is channel-shaped in cross section and is rotatably mounted on the flange 182 formed integrally with the rear cutter head section 158, the tension adjusting ring having an outwardly extending flange 264 which covers and conceals the ends of the bearing openings 236 in the rear casing section 158 and having a flaring rear flange 265, the rear face of which forms a continuation of the bevel 183 of the flange 182, as best shown in Figs. 17 and 19.

The tension imposed on the cutter and scraper arm cranks 221 and 230 by the springs 261 and tension adjusting ring 263 is adjusted by a screw 266 which, as best shown in Figs. 19 and 22, is tangentially disposed and is mounted in a lug 267 projecting rearwardly from the web 181 of the rear cutter head section 158 through an elongated recess 268 provided in the flange 264 of the tension adjusting ring at that point. The end of the adjusting screw bears against a lug 269 in the channel of the tension adjusting ring 263 and it will be seen that by screwing the adjusting screw 266 in, the tension adjusting ring 263 is rotated to increase the tension on all of the springs 261.

Means are provided for limiting the amount of inward movement of the cutter and scraper arms under the influence of the springs 161 which are constantly under tension. This means comprises an adjusting screw 275 which extends through a threaded hole 276 in the rim 180 of the rear cutter head section 158 and, as shown in Fig. 18, engages a pin 277 provided on the counterweighted portion of one of the scraper cranks 230 and limits its outward movement. Since the cutter and scraper cranks 221 and 230 are all interconnected by the rings 250 and 245, the action of the limit screw 275 in limiting the movement of one of these cranks effects a corresponding limit on all of them. The adjustment of the screw 275 adjusts the minimum diameter of all of the scrapers and cutters.

A ring 280 is arranged against the rear face of the web 181 of the rear cutter head section 258 and is held in place by a wire ring 281. The principal purpose of this ring 280 is to cover the slots 259 through which access to the screws 254 is obtained. It is not, however, necessary to remove the ring 280 to gain access to the slots and screws, the ring being provided with a knob 278 (Fig. 22) by means of which the ring can be rotated to bring three holes 279 into register with the heads of the screws 254 for the purpose of loosening or tightening them. The wire ring 281, as best shown in Figs. 17, 22 and 23, is formed to provide ears 282 which project through openings 283 in the rearwardly projecting annular flange 182 formed integrally with the rear cutter head section 158. These ears 282 also extend into grooves 284 (Fig. 22) provided on the inner face of the tension adjusting ring 263, these grooves 284 being concentric with the head so that the tension adjusting ring is free to rotate. It will be seen that the provision of the wire ring 281 retains the ring 280 in proper position and the ears 282 of this ring also hold the tension adjusting ring 263 against axial displacement from the flange 182.

The juices and scrapings discharged through the opening 167 of the rotary cutter head are carried rearwardly by the flaring form of this head and discharged over the outwardly flaring surfaces of the flanges 182 and 265 from which they are thrown against the inner surface of the discharge hood 120, this discharge hood being composed of upper and lower sections 286 and 287 and the bottom of the lower section sloping downwardly to form a discharge chute 288. The upper section 286 of the discharge hood is removably secured to and swings upwardly with the upper cutter head holder section 192.

The severed kernels, thrown off in advance of the vertical face 166 of the rotary cutter head, are caught by the flaring face 169 of the rim 168 and thrown against a housing 290 which is removably supported on the brackets 87 and 125 and completely houses the feeding spur wheels 76, 82, 76a, 82a and the guide mechanism carried by the plate 123, this housing 290 having a hooded inlet opening 291 for the ears of corn. The kernels thrown against this housing 290 drop into a discharge hopper 292 formed integrally with the top of the table 35.

The corn cutter can be used for cutting whole kernel style of corn in which the principal product is substantially entire kernels with a by-product of scrapings, or by a simple substitution of a different type of cutters and scrapers and spur wheels can be used for cutting cream style corn consisting of the soft interior portions of the kernels and the caps removed to permit of scraping the interior portions out. With the unusually large or matured kernels other substitutions can be made, such as the slitting guides illustrated in Figs. 10 and 11 for preslitting the kernels in cutting cream style corn from mature ears or the double slice knives illustrated in Figs. 26 and 27 for cutting a type of whole kernel style corn from ears having excessively large kernels.

In the cutting of normal whole kernel style corn, the corn cutter is set up as illustrated in Figs. 1–9 and 12–25 and the type of cutter and scraper arms illustrated in perspective in Figs. 15 and 16 are employed.

The cutters 300 each includes a hub 301 having a hexagonal recess 302 which fits over the hexagonal end 223 of any of the cutter arm cranks 221, these hexagonal ends projecting forwardly from the vertical face 166 of the cutter head, as best illustrated in Fig. 17. The hubs preferably come equipped with captive screws 303 which are turned by inserting a small hexagonal wrench in a hexagonal hole in the end of each screw. Formed integrally with the hub and extending radially outward is a flat arm 304, this arm being located near the outer end of the hub to permit the scraper arms to lie between them and the face 166 of the rotary head.

The outer end 305 of each cutter arm 304 is formed to extend toward the axis of the cutter head and this end then extends laterally, substantially parallel with the axis of the cutter head to provide a blade 306 the end edge 307 of which is obliquely sharpened to insure good cutting. The blade 306 is specially formed to act as a scoop in quickly throwing off the severed kernels which tend to come off in strings. To this end the blade 306 has a comparatively thin advance edge while its trailing side is thickened at the corner between the arm 304 and the blade 306, as indicated at 308, Fig. 16, so as to form a scoop-like blade which throws off the cut kernels as fast as they are cut off and slide up on the blade. This prevents jamming of the kernels between the blade and arm and insures the smooth discharge of them from the blade. The blades 306 of the cutters extend forwardly or in opposition to the advancing ears and extend well ahead of the plane of the face 166 of the cutter head as illustrated in Fig. 17.

The scrapers 310 each includes a hub 311 formed similarly to the hubs 301 of the cutters with a hexagonal recess fitting over the hexagonal end of the scraper cranks 230 and carrying a captive screw 313 by means of which the hubs are secured to the projecting hexagonal ends of the cranks 230. The arm 314 of each scraper is flat and extends radially outward from that end of the hub adjacent the flat face 166 of the rotary cutter head so that the scraper arms 314 lie behind the cutter arms 304 as illustrated in Fig. 13. The outer end 315 of each scraper arm 314 is bent toward the axis of the rotary head and is then bent rearwardly in the direction of movement of the ears to form a scraping head 316, the effective part of which is arranged in rear of the plane of the face 166 of the scraper head, as best illustrated in Fig. 17.

With six cutters and scrapers 300 and 310 mounted as shown in Fig. 17, it will be seen that the kernels cut off by the blades 306 will be thrown radially outward by centrifugal action in advance of the face 166 of the rotary head and will hence be caught by the conical face 169 of the cutter head and directed forwardly or in the direction opposite to the advancing ears and deposited in the hopper 292 as whole kernel corn. The scrapings and juices scraped out by the scrapers 310 are likewise thrown radially outward but in rear of the plane of the face 166 of the rotary head and are hence caught by the conical face 174 of the head and directed in the opposite direction from the whole kernel corn and deposited in the chute 288 as a by-product. The construction of the rotary head and the form and arrangement of the cutters and scrapers 300, 310 therefore permits of substantially complete separation of the kernels severed and the meat and juices scraped from the ears of corn thereby providing a whole kernel corn of higher quality as compared with a mixture of the kernels, scrapings and juices.

With some corn the kernels are so large that whole kernel corn cut as above described, would result in kernels too large to be in the most salable form. It therefore becomes desirable to cut the kernels from the ear in two slices by the cutters and scrapers shown in Figs. 26 and 27. When so cutting the kernels off in two slices, the cutters 300 are substituted by the cutters 320 which are of the same general form and mounted in the same manner except that the blade 321 at the end of the arm 322 is stepped so as to provide a rounding shoulder 323 spaced from the arm 322 which throws off the kernels severed by the cutting edge 324. In cutting the kernels off in two slices the scrapers 310 are each substituted by a combined cutter and scraper 325 having a flat arm 326 working in rear of the corresponding cutter arm 322 and having its outer end formed to provide both a cutting blade 327 similar to the blade 306 of the cutter 300 and a scraping head 328 similar to the scraping head 316 of the scraper 310. The effective edge of the scraper 328 is located inwardly of the edge of the blade 327 and the edge 324 is adjusted to be located still further away from the axis of the rotary head. It will therefore be seen that the blades 321 cut an initial slice from each kernel and the blades cut a second slice from each kernel both of which are thrown outwardly in advance of the face 166 of the cutter head so as to be collected free from scrapings. The scraper 328 then scrapes out the remaining meat and juices from the kernels, these being thrown out in rear of the face 166 of the rotary head and hence collected separately from the chute 288.

In cutting cream style corn, if the kernels are quite matured it may be desirable to slit the kernels to facilitate the decapping and scraping operation. To do this the guide arms 132 carried by the removable plate 123 are removed and slitting guide arms 332, illustrated in Figs. 10-11, substituted therefor. Each of these guide arms 332 has a tapered guide nose 334 similar to the guide head 134 on each of the arms 132 but the trailing part 335 of the guide nose 334 is provided with a plurality of slots 336 each receiving a small slitting blade 337. These blades are held in position by a small cross bar 338 and screws 339 extending through this cross bar and into the arm 336. It will be seen that the passing ears are both brought into proper alignment by the heads of the guide arms 336 and are also slitted by the small blades 337.

In cutting cream style corn, the tearing of the kernels by the feeding spur wheels is immaterial, since the product consists essentially of the soft interior portions of the kernels. Since the action of the cutter head is principally a scraping action in contradistinction to being principally a cutting action in cutting whole kernel corn, the ear must be held more securely in cutting cream style corn as compared with whole kernel corn. Therefore in cutting cream style corn it is desirable to remove the feeding spur wheels 76, 82, 76a and 82a, which have a single row of spurs, and substitute the type of spur wheels used at all times as the discharge spur wheels 76b, 82b and which have two rows of spurs and hence grip the passing ears of corn more firmly.

In cutting cream style corn all of the cutters and scrapers 300, 310 are removed and replaced with the cutters and scrapers illustrated in perspective in Fig. 29. Each cream style cutter 385 has a hub 386 identical with the hubs 301 of the cutters 300 and an integral flat arm 387 projecting outwardly therefrom. The blade 388 projects forwardly a relatively short distance from the arm 387 and is provided with a relatively long cutting edge 389.

The scrapers for cutting cream style corn are of two lengths in order to properly operate and clear one another, three of each type being mounted on the hubs of the scraper cranks 230. One type of scraper arm, designated at 390, has a hub 391 identical with the hubs 311 of the scrapers 310 and an integral, flat and relatively long arm 392 projecting outwardly therefrom a sufficient distance so that the scraper head 393 is located adjacent the tip of the blade 389 of the preceding scraper 385. The scraper head 393, instead of extending rearwardly from the arm 392 extends forwardly therefrom so that its effective edge is in advance of the flat face 166 of the rotary head. The other scrapers 395 each has a hub 396 identical with the hubs 391 of the scrapers 395 and an integral, flat relatively short arm 397 projecting outwardly therefrom. At the end of each of these arms a scraper head 398 is provided, the arm 397 being of such length that this head 398 is located immediately in advance of the following cutting blade 388. The scraping head 398 extends forwardly, or toward the inlet end of the machine, from the arm 397 in the same manner as the scraping head 393 to remove the soft portion from the kernels in advance of the flat face 166 of the rotary head. The effective blunt edge of the scrapers 390 and 395 all travel in the same circle.

In setting up the rotary head for cutting cream style corn, three cutters 385 are secured to the hubs of alternate cutter arm cranks 221, the others being left blank as shown. One of the scrapers 395 is then mounted on the hub of each scraper crank 230 immediately in advance of each cutter 385. One of the scrapers 390 is then mounted on the hub of each scraper crank 230 immediately following each cutter 385. The screws 254 are then loosened and the rings 245 and 250 adjusted so that when the heads of the scrapers 390 are in engagement with the cob the blades 388 of the cutters will sever the caps only from the kernels. If the cutter has previously been used for cutting whole kernel style corn, the tension on the scrapers is, of course, increased. The corn cutter is then ready for producing cream style corn, the cutters 385 first decapping the kernels and the scrapers 390 and 395 scraping down to the cob and acting as a gage for the depth of cut of the cutter 385. The caps cut off by the cutters 385 and the soft interior portions scraped out by the scrapers 390 and 395 are thrown out ahead of the face 166 of the rotary head and hence are discharged by the flaring face 169 of the head into the hopper 292 as cream style corn.

In the cutting of corn, particularly whole kernel style corn, for freezing, it is now customary to first blanch the ears before the kernels are cut to set the starch. This blanching leaves the cob very soft and very easily broken, particularly at its tip. For cutting the kernels from such blanched ears it was found that the type of "whole kernel" scrapers shown in Fig. 12 and also the type of "cream style" scrapers illustrated in Fig. 29 had their heads disposed too abruptly to operate on the soft blanched ears, their abrupt heads engaging the cob tips so firmly as to break them off. To provide a type of scraper which would act more gently and still press out the soft interior portions of the kernals remaining after passing the cutters and thereby gage these cutters from the cob, the scrapers shown in Fig. 32 were designed. These scrapers, indicated generally at 400, each has a hub 401 identical with the hubs 311 of the scrapers 310 and an integral, flat arm 402 projecting outwardly therefrom. The scrapers shown are designed to produce whole kernel corn and hence its head 403 projects in the direction of travel of the ears or opposite to the blades of the cutters so that its effective portion is located in rear of the plane of the flat face 166. This head is of sinuous form so as to provide a relatively flat portion 404 having a broad bearing on the flat kernels and terminating in a rounding end 405 which has a very gentle scraping or pressing action on the cut kernels. It will be seen that this type of scraper is very gentle in its action and hence adapted for use in connection with blanched ears the cobs of which are soft and fragile.

Operation and adjustment

Assuming that corn is to be cut as whole kernel style corn the operator throws the lever 55 (Fig. 5) which, through the rock shaft 54, link 52 and arm 51, closes the clutch 50, thereby establishing a driving connection between the flywheel 49 and the main drive shaft 45 (Fig. 3). The rotation of the main drive shaft 45 through the transmission contained in the case 150 (Fig. 1) drives the pulley 151 and V-belt 152. This V-belt engages with the drive rim 153 (Fig. 6) of the drive head 85 and consequently rotates the entire drive head 85 with the knives 300 and scrapers 310 mounted thereon, the drive rim 153 being rotatably supported by the three pairs of bearings 200 (Fig. 13) in the two part holder 190, 192.

The rotation of the drive shaft 45 (Fig. 3), through the worm 60, worm wheel 61 and gears 62—66, drives the shaft 67 which, through the universal 68 (Fig. 2), drives the shaft 69 carrying the pair of sprockets 41 (Fig. 6) which drive the feed chains 40. At the same time the rotation of the gear 63 drives the pair of gears 70, 72 (Fig. 3) which, through the universals 74 and 80 (Fig. 7) and upper and lower shafts 75 and 81, drive the first pair of feeding spur wheels 76 and 82. The second pair of feeding spur wheels are also driven through the gear 104 (Fig. 3) driving the gears 105, 109. Through the pins 111, 112 the gear 109 drives the shaft 110 which, through the universal 74a (Fig. 1), drives the upper spur wheel shaft 75a and the spur wheel 76a (Fig. 6). Similarly, the lower gear 105 (Fig. 3), through the pins 107, 108, drives the shaft 106, this shaft, through a universal similar to the universal 80, driving the spur wheel shaft 81a and spur wheel 82a (Fig. 6).

The discharge spur wheels are driven through the gears 115, 116 and 118 (Fig. 3) which, through the shafts 117, 119 and universals, drive the upper and lower spur wheel shafts 75b, 81b and the discharge spur wheels 76b and 82b mounted thereon. The upper spur wheels 76, 76a, 76b are driven in the opposite direction to the lower spur wheels 81, 81a, 81b and in the direction to feed the ears of corn from the chain 40 to the discharge end of the machine.

The operator places the husked ear of corn lengthwise in the trough 37 along which it is propelled endwise by the fed chains 40 and is presented tip first, through the inlet opening 291, to the pair of spur wheels 76, 82.

The spurs of these spur wheels positively engage the opposite sides of the ear of corn and propel it against the tapering heads 134 of the guide fingers 132 (Fig. 6). The ears of corn are always larger than the minimum spacing of the feeding spur wheels 76, 82 and as the ear of corn is engaged with these spur wheels they open up, this opening being permitted by the universals 74 and 80 (Fig. 7) and the sliding mounting for the free ends of the spur wheel shafts 75 and 81. This sliding mounting includes the skeleton sleeves 95 guided in the guideways 96 and these sleeves are connected by the toggle links 94 to the spring loaded sleeve 92 mounted on the rod 90 so that the spur wheels 76, 82 are always moved an equal distance apart from a common center as they are opened up. The rotation of the cam block 101 (Fig. 8) provides two adjustments for the minimum spacing of the spur wheels 76 and 82 and the slides 89 prevent silk or juices from escaping through the slots 86, through which the spur wheel shafts 75 and 81 project and move. Since the spur wheels 76, 82 are always moved an equal distance from a common center each ear of corn is caused to be positioned with its axis in the same horizontal plane regardless of its diameter and in such position is fed between the heads 134 of the fingers 132 mounted on the removable plate 123 (Figs. 6 and 9). These fingers 132 are all tied to the rotating ring 128 which is yieldingly held in one extreme position by the adjustable spring 135. In this extreme position the tapered heads 134 of the guide fingers 132 are at their minimum spacing and as the tip of the ear of corn is forced into the opening formed between these heads 134, these heads open up uniformly in the manner of a camera shutter. Hence, each ear of corn is brought to a position in which its axis coincides with the common center of the several heads 134, this common center being coaxial with the axis of the rotary head 85, as illustrated in Fig. 6.

As the tip of the ear passes through the heads 134 of the guide fingers 132, it is brought into engagement with the second pair of feeding spur wheels 76a, 82a which are guided in their expanding and contracting movement in the same manner as the feeding spur wheels 76 and 82 so that the feeding spur wheels 76a, 82a, in all positions, are disposed an equal distance from the axis of the ear of corn passing therethrough. These feeding spur wheels 76a, 82a present the ear of corn to the cutters 300 and scrapers 310 of the rotary cutter head 85. The axis of the ear of corn so presented to the rotary head 85 is coincident with the axis of the head and consequently the blades 306 of the several cutters 300 are located an equal distance from the axis of the ear.

Since the blades 306 of the several cutters 300 project toward the ear of corn they cut into the kernels at the tip of the ear, the kernels so cut away being thrown outwardly by centrifugal force against the tapered or outwardly flared surface 169 of the front section 168 of the rotary head 85.

Before the forwardly projecting blades 307 of the cutters 300 are able to cut into the cob of the ear the tip of the ear engages the heads 315 of the scrapers 310 (Fig. 17) and the tapering form of the tip of the ear causes these scraper heads to move outwardly. This outward movement of the arms 314 of the scrapers rotates the cranks 230 on which the several scrapers are mounted and, through the pin 232 and block 244 on each of these cranks, rotates the ring 245 to which all of the scrapers are connected so that all of the scrapers are compelled to move outwardly at the same rate of speed from the axis of the ear of corn and the rotary cutter head.

The rotation of the ring 245, through the screws 254 (Fig. 19), rotates the ring 250. The slots 251 in this ring 250 engage the sliding blocks 249 journalling the crank pins 222 of the cranks 221 which carry and rotate with the arms 304 of the cutters 300. It will therefore be seen that the opening up of the scrapers 310 effects, through the rings 245 and 250, a corresponding opening up of the blades 306 of the cutters 300 and that therefore the scrapers act as a gage for gaging the depth of cut from the cob itself and insure that the kernels are cut off close to the cob and the maximum yield of whole kernel corn obtained. Since the effective edges 316 of the scrapers 310 scrape out the remaining soft portions of the kernels and down to the cob itself, it will be seen that the cutters can be very accurately set to cut off the kernels substantially at the cob line and that as the cob increases or decreases in diameter from its tip to its shoulder the cutters are caused to open up and contract accordingly. The cutters and scrapers are yieldingly held in their innermost position (determined by the adjusting screw 276, Fig. 18) by the several springs 261 (Fig. 22) which yieldingly hold the cranks 230 in the position in which the cutter and scraper arms are in their minimum adjusted position. The tension of these springs 261 is adjusted by the screw 266.

The kernels cut off by the blades 306 of the cutters 300 are thrown out against the outwardly flaring face 169 of the front section 157 of the cutter head 85 and the juices and scrapings removed by the scrapers 310 are thrown outwardly against the rearwardly flaring face 174 of the same cutter head section 157. The kernels are therefore discharged forwardly from the rotary cutter head 85 and the juices and scrapings rearwardly and it will therefore be seen that a complete separation takes place, the whole kernel corn being free from scrapings and excess juices and hence being of high quality. The cut kernels are discharged from the knives within the casing 290 (Fig. 9) from which they pass downwardly to the discharge hopper 292 (Fig. 6). The scrapings removed by the scrapers 310 are caused to be discharged rearwardly from the head 85 by the rearwardly flaring bore 174 through the head and are discharged against the walls of the two part discharge hood 120, the lower part of which is formed to provide the discharge chute 288.

The cut and scraped tip of the corn is picked up by the discharge spur wheels 76b and 82b and discharged through the discharge hood 120 from the machine. As with the feeding spur wheels 76 and 82 these discharge spur wheels 76b and 82b are free to float, but always move an equal distance from the common center line which is coaxial with the axis of the rotary head 85 and the passing ears. In order to insure that the ears of corn do not interfere with one another in their procession through the machine the discharge spur wheels 76b and 82b are driven at a higher rate of speed than the feeding spur wheels, this difference in speed being occasioned by the use of smaller gear wheels 118 and 116 (Fig.

3) for driving the discharge spur wheels than the corresponding gears 70, 72, 105 and 109 which drive the feeding spur wheels. When the cob is engaged by the discharge spur wheels its movement is accelerated and provision is made which permits the pair of feeding spur wheels 76a, 82a to run ahead of its drive so that the cob is not torn between the two pairs of spur wheels running at different times. Thus the accelerated movement of the spur wheels 76a and 82a cause their shafts and the shafts 119 and 106 (Fig. 3) to run ahead of the gears 109 and 105, the pins 111 and 107 leaving the pins 108 and 112. After the ear has passed the feeding spur wheels 76a and 82a, the pins 112 and 108 catch up, respectively, within pins 111 and 107, and reestablish the driving connection for the spur wheels 76a and 82a so that the next ear of corn is properly fed to the rotary cutter head 85. This acceleration in the movement of the ear in passing through the rotary cutter head prevents the machine from being jammed because of possible overlapping in the ears placed upon the feed chains 40.

Assuming that the next run of corn is of larger diameter and it is desired to cut off the kernels a greater distance from the cob the machine would be adjusted as follows before starting operation:

The cam plate 100 (Fig. 8) would be turned so that its major diameter would be interposed between the skeleton sleeves 95, thereby increasing the minimum spacing of the feeding spur wheels 76 and 82. The same adjustment would be made of the feeding spur wheels 76a, 82a and the discharge spur wheels 76b, 82b. This opens up all of the spur wheels and results in reducing the tearing of the kernels of the ears of corn and a smoother passage of the ears of corn through the machine.

Similarly, the minimum spacing of the guide heads 134 of the guide arms 132 would be increased. Similarly, the tension of the guide arms 132 on the removable plate 123 would be decreased. This would be effected, as shown in Fig. 9, by backing off the screw 137 so as to relieve the tension of the spring 135. By doing this the tapered guide heads 134 can be spread apart more freely and hence are adapted to the larger diameter of the corn being run.

The remaining adjustments are effected in the rotary cutter head 85. To effect these adjustments the spring loaded latch 196 is swung out and the upper half 192 of the rotary cutter head holder is swung up about its hinge 194 (Fig. 13) so as to expose the complete rotary cutter head. This rotary cutter head can then be directly lifted upwardly off of the two lower pairs of supporting bearings 200 and out of the lower half 190 of the rotary cutter head holder. The cutter head is then freed from the V-belt 152 and can be taken to any suitable place for the necessary adjustments.

In the adjustment of the cutting, gaging and scraping mechanism carried by the head, it is unnecessary to take anything apart. In order to adjust the depth of cut the operator takes hold of the knob 278 on the ring 280 and turns this ring until the holes 279 register with the screws 254 which adjustably secure the two rings 245 and 250 together. These screws are then loosened so as to break the connection between the two rings 245 and 250, the ring 250 being then movable relative to the ring 245 by virtue of the screws 254 passing through the slots 253 in the ring 250. The pointer 256 is then moved to the desired position on the cutting depth gage 258 (Fig. 14) and the screws 254 again tightened to reconnect the rings 245 and 250 in this new relation. Since we have assumed that a cut of less depth is desired the pointer 256 would be moved in the corresponding direction along the graduations 258. This readjustment of the rings 245 and 250 effects an adjustment of the relative positions of the cutters 300 and the scrapers 310, because the ring 245 is connected, through the cranks 230, with each of the scrapers 310 while the ring 250 is connected, through the cranks 221, with each of the cutters 300. By the readjustment above assumed the heads 315 of the several scrapers are adjusted inwardly relative to the blades 306 of the several cutters so that when the scrapers engage the cob the cutters are held outwardly a greater distance from the cob and accordingly cut at a greater distance from the cob line than before the adjustment was made. With the assumed increase in diameter of the cob, it is also desirable to increase the minimum spacing of both the scrapers and the cutters. To effect this the operator applies a screw driver to the exposed head of the screw 275 (Fig. 18) and backs this screw up. Since this screw limits the inward movement of one of the scrapers it limits the inward movement of all of the scrapers and cutters accordingly and its adjustment thereby determines the minimum spacing of these members.

With the larger ears it is also desirable to relieve the tension which is imposed upon the scrapers 310 so that the scrapers do not tear out portions of the cob. To do this the operator backs off the screw 266 (Fig. 22) so as to permit the ring 263 to move clockwise, as viewed in Fig. 22, and thereby relieve the tension on the several springs 261. Since the screw 266 is mounted on a lug fast to the rear section 158 of the rotary cutter head and the springs 266 are interposed between the adjusting ring 263 and the pins 238 on each of the cranks 230 carrying the scrapers, it will be seen that relieving the tension of the springs 266 relieves the inward pressure which the scrapers 310 exert upon the cob.

After these adjustments have been effected the face ring 280 is turned back by means of the knob 278 to cover the ends of the screws 254 which were exposed through the holes 279 during the above adjustment.

After the adjustments have been made the head is, of course, replaced in the two part holder 190, 192 and the V-belt reapplied, after which the two parts of the holder are reconnected by the spring latch 196. The machine is then ready for operating on the larger diameter, large kerneled corn upon throwing the clutch lever 55.

Assuming that in the next run of corn the kernels of the ears are so large that upon cutting them off, as above described, the product is too large to be salable, the following substitution would be made:

The rotary cutter head 85 is removed, as above described, and all of the cutters and scrapers 300, 310 removed by unscrewing their captive screws 303 and 313 and slipping them off from the projecting ends of the hubs of the cranks 221 and 230, respectively. The cutters so removed are then replaced with the cutters 320 illustrated in Figs. 26 and 27 which are the same except that the blade of each of the cutter arms 320 is stepped. Each of the scrapers 310 is then replaced with the combined scraper and cutter 325, this combined scraper and cutter having a scraper head 328 and also an elevated blade 327. After the substitution has been effected the relative spacing of the blades 327 and 325 can be adjusted by turning the face plate 280 to uncover the screws 254 and loosening these screws which connect the rings 245 and 250 and moving the index 256 to space the cutters 324 and 327 further apart or closer together as may be necessary. The screws 254 are then tightened to hold the rings 245 and 250 in their new relation. The face ring 280 is then returned to its original position and the drive head 85 replaced in the machine. The machine is then ready for cutting and it will be seen that as the ears of corn pass the rotary head the blade 324 takes off a shallow slice from the kernels after which which the blade 327 takes off a second slice from each kernel, the remaining soft portions and juices being scraped out by the scrapers 328. It will be observed that the scrapers 328 scrape down to the cob and hence act as a means for directly gaging the depth of cut of the blade 327 and causes the blades 327 to move outwardly and inwardly, following the taper of the ear. Similarly, through the rings 245 and 250, and the cranks 221 and 230 connecting the cutters and scrapers 320 and 325 together, the scrapers 328 act as gages for determining the spacing of the blades 324 and compel these blades to move outwardly as the diameter of the cob increases in size due to its taper. It will also be noted that the portions of the kernels cut from the ear by the blades 327 and 328 are thrown outwardly in advance of the face 166 of the cutter head so as to be caught by the flaring rim 168 to be discharged through the hopper 292, whereas the scrapings removed by the scrapers 328 are thrown outwardly against the rearwardly flaring face 174 of the rotary cutter head and are discharged through the chute 288.

Assuming that with the next run of corn it is desired to cut cream style corn the following substitutions are made:

Since the production of cream style corn is a matter of decapping the kernels and scraping out the soft interior portions of the kernels it will be seen that it is essentially a scraping operation and hence much greater twisting forces are imposed upon the ears. Therefore it is desirable to provide feeding spur wheels which grip the kerneled ears more firmly than the spur wheels used in whole kernel style corn production. For this reason all of the feeding spur wheels 76, 82, 76a and 82a which have but a single row of spurs, are removed and spur wheels similar to the discharge spur wheels 76b and 82b and having a double row of spurs substituted. These latter spur wheels have twice as many spurs and hence grip the kerneled ears with greater effect. Their use as feeding spur wheels would be undesirable in the production of whole kernel style corn because the increased number of teeth would increase the number of punctured kernels and hence adversely affect the appearance of the product.

In the production of cream style corn the rotary cutter head 85 is removed, as above described, and all of the cutters and scrapers used in the production of whole kernel style of corn taken up by unscrewing the captive screw which secures each of these cutters to the hub of a corresponding crank. These cutters and scrapers are then replaced by the cutters and scrapers shown in Figs. 28 and 29. Three of the hubs 220 of the cranks 221 carrying the cutters are left blank as illustrated in Fig. 28. On the other three of these hubs the cutters 385 are mounted. On three of the hubs 231 of the scraper cranks 230 are mounted the relatively short scrapers 395, the heads 398 of which are arranged immediately behind the blade 338 of a corresponding cutter. On the other three hubs 231 of the scraper cranks 230 are mounted the relatively long scrapers 390, the heads 393 of which are arranged immediately in advance of a corresponding scraper blade 388.

The face plate 280 is then turned by means of its knob 278 to aline the openings 279 with the heads of the screws 254 and these screws loosened. The index pointer 256 is then moved along the gage 259 thereby to adjust the positions of the rings 245 and 250 so that the blades 388 of the cutters are spaced outwardly from the scraping heads of the scrapers 390 and 395 a sufficient distance to insure that the blades 388 will merely decap the kernels and not remove any more than is necessary to expose the interior portions of the kernels. After this the ring 280 is turned to conceal the screws 254 and the head 85 is replaced in the machine.

It is apparent that the ears of corn will be propelled through the machine by the double row spur wheels in the same manner as the spur wheels 76, 82, etc. propel the ears through in producing whole kernel style corn. When, however, the ears engage the blades 388 of the cutters 385 these cutters will merely decap the kernels. The kernels so decapped are then subjected to a thorough scraping action by the heads 398 of the scrapers 395, and the heads 393 of the scrapers 390 which heads are on the same circle and scrape down to the cob and remove all the remaining soft interior portions of the kernels. It will therefore be seen that the scrapers 390 and 395 act as gages and compel, through the interconnecting rings 245 and 250 and the cranks 221 and 230, the cutters 395 and the cutters 385, to move outwardly as the cob diameter increases because of the tapering form of the ear.

It will be noted that in the production of cream style corn the cutter blades 388 and the cutter heads 393 and 398 all project forwardly from their flat supporting arms. Therefore the caps and also all of the scrapings removed from the cob are thrown outward in advance of the forwardly facing face 166 of the cutter head and hence are deflected forwardly by the forwardly flaring or conical flange 168 of the cutter head into the hopper 292.

In the event that the kernels are too hard to permit the production of cream style corn, as above described, the guide arms 132 on the plate 123 are removed and the guide arms 332 substituted therefor. These guide arms 332 are equipped with a plurality of sharp blades 337 which cut into the kernels of the passing ears and hence facilitate the removal of the cap portions of the kernels by the cutters 385.

In the event that it is desired to cut whole kernel style corn from ears which have been blanched to set the starch preparatory to the production of frozen corn, this blanching rendering the cob very soft and fragile, the type of scraper arms illustrated in Fig. 32 are employed. These arms have heads of sinuous form to provide a broad face which engages the kernels remaining on the cob after passing the cutters and terminates in a rounding end which gently presses or scrapes down to the cob to act as a gage for gaging the cutting line from the cob without danger of breaking off the soft tip of the cob.

From the foregoing it will be seen that the present invention provides a very compact rotary type corn cutter which is readily adaptable for the production of both whole kernel and cream style corn and which has high capacity with little power consumption and extracts all of the edible portions of the kernels, leaving the cob completely stripped in the production of both whole kernel and cream style corn. It will further be seen that the invention permits of cutting the kernels off very close to the cob line thereby securing the maximum yield of whole kernel corn and at the same time insuring the minimum loss of juices and pulp in the subsequent washing and cleaning of the cut kernels. The invention also, particularly in the ready removability of the single guide plate carrying the guide arms and the cutter head carrying all of the mechanism associated with the cutters and scrapers or gages, provides a machine which is readily accessible for cleaning, adjustment and repairs. Further, by the ready removal of the rotary cutter head and the provision of external adjustments on this head for adjusting the depth of cut, the spring tension on the cutters, and the minimum spacing of the cutters and scrapers, it will be seen that the most important adjustments of the machine can be accomplished very easily, accurately and quickly. It will further be apparent that the invention accomplishes the other objects set forth in the preamble hereof, particularly in such features as the construction of the means for supporting the spur wheel shafts and the means whereby the rotary head is sealed around its periphery.

It will be understood that the invention is capable of wide modification and is therefore not to be limited to the specific form shown but is to be accorded the full range of equivalents comprehended by the accompanying claims.

I claims as my invention:

1. In a high speed rotary corn cutter, a single rotary head, means for conveying the ears of corn endwise through said head, means for rotating said head relative to said ears, a device pivotally connected to said head and having a cutting edge only, said cutting device being adapted to pass circumferentially about said ears and sever the kernels, a gaging device separately pivoted to said head and having a blunt end having a relatively short contact lengthwise of the ear and adapted to scrape through to the cob, a ring rotatably mounted on said head, means operatively connecting said ring with said cutting device to rotate with the movement of said cutting device toward and from the axis of said head, a second ring rotatably mounted on said head, means operatively connecting said last ring with said gaging device to rotate with the movement of said gaging device toward and from the axis of said head, and means adjustably connecting said rings and compelling them to move in unison but permitting them to be adjusted relative to one another, the blunt end of said gaging device being at all times disposed inside of the cutting line of said cutting device and the depth of cut thereby determined by the engagement of said gaging device with the cob whereby said cutting edge and blunt end closely follow the undulation of the cob while traversing the entire length of the ear.

2. In a high speed rotary corn cutter, a single rotary head, means for conveying the ears of corn endwise through said head, means for rotating said head relative to said ears, a device pivotally connected to said head and having a cutting edge only, said cutting device being adapted to pass circumferentially about said ears and sever the kernels, a gaging device separately pivoted to said head and having a blunt end having a relatively short contact lengthwise of the ear and adapted to scrape through to the cob, a ring rotatably mounted on said head, means operatively connecting said ring with said cutting device to rotate with the movement of said cutting device toward and from the axis of said head, a second ring rotatably mounted on said head, means operatively connecting said last ring with said gaging device to rotate with the movement of said gaging device toward and from the axis of said head, and means adjustably connecting said rings and compelling them to move in unison but permitting them to be adjusted relative to one another, comprising a slot in one of said rings and extending generally concentric with its axis and a screw extending into said slot and into a screw hole provided in the face of the other ring, the blunt end of said gaging device being at all times disposed inside of the cutting line of said cutting device and the depth of cut thereby determined by the engagement of said gaging device with the cob whereby said cutting edge and blunt end closely follow the undulation of the cob while traversing the entire length of the ear.

3. In a high speed rotary corn cutter, a single rotary head, means for conveying the ears of corn endwise through said head, means for rotating said head relative to said ears, a device pivotally connected to said head and having a cutting edge only, said cutting device being adapted to pass circumferentially about said ears and sever the kernels, a gaging device separately pivoted to said head and having a blunt end having a relatively short contact lengthwise of the ear and adapted to scrape through to the cob, a ring rotatably mounted on said head, means operatively connecting said ring with said cutting device to rotate with the movement of said cutting device toward and from the axis of said head, a second ring rotatably mounted on said head, means operatively connecting said last ring with said gaging device to rotate with the movement of said gaging device toward and from the axis of said head, means adjustably connecting said rings and compelling them to move in unison but permitting them to be adjusted relative to one another, the blunt end of said gaging device being at all times disposed inside of the cutting line of said cutting device and the depth of cut thereby determined by the engagement of said gaging device with the cob whereby said cutting edge and blunt end closely follow the undulation of the cob while traversing the entire length of the ear, and means for indicating the relative adjustment of said rings comprising a pointer carried by one ring.

4. In a high speed rotary corn cutter, a single rotary head, means for conveying the ears of corn endwise through said head, means for rotating said head relative to said ears, a device pivotally connected to said head and having a cutting edge only, said cutting device being adapted to pass circumferentially about said ears and sever the kernels, a gaging device separately pivoted to said head and having a blunt end having a relatively short contact lengthwise of the ear and adapted to scrape through to the cob, a ring rotatably mounted on said head, means operatively connecting said ring with said cutting device to rotate with the movement of said cutting device toward and from the axis of said head, a second ring rotatably mounted on said head, means operatively connecting said last ring with said gaging device to rotate with the movement of said gaging device toward and from the axis of said head, means adjustably connecting said rings and compelling them to move in unison but permitting them to be adjusted relative to one another, the blunt end of said gaging device being at all times disposed inside of the cutting line of said cutting device and the depth of cut thereby determined by the engagement of said gaging device with the cob whereby said cutting edge and blunt end closely follow the undulation of the cob while traversing the entire length of the ear, and means for indicating the relative adjustment of said rings comprising a pointer carried by one ring and traversing a graduated scale provided on said head.

5. In a high speed rotary corn cutter, a single rotary head, means for conveying the ears of corn endwise through said head, means for rotating said head relative to said ears, a plurality of cranks mounted on said head and having their axes arranged substantially parallel with the axis of said head, a cutting arm fixed to the hub of each of said cranks and having a cutting edge adapted to pass circumferentially about said ears and sever the kernels, a second group of cranks rotatably mounted on said head and having their axes arranged substantially parallel with the axis of said head, a gage arm fixed to the hub of each of said second cranks and having a blunt end having a relatively short contact lengthwise of the ear and adapted to scrape through to the cob, a ring arranged substantially concentric with said head and operatively connected with each of said first cranks carrying the cutter arms, a second ring arranged substantially concentric with said head and operatively connected with each of said second cranks carrying the gage arms, and means for adjustably connecting said rings to rotate in unison to move said arms in unison toward and from the axis of the head so that the blunt ends of the gage arms are at all times disposed inside of the cutting line of said cutting arms and the depth of the cut thereby determined by the engagement of said blunt ends with the cob and whereby said cutting edges and blunt ends closely follow the undulation of the cob while traversing the entire length of the ear.

6. In a high speed rotary corn cutter, a rotary head, means for conveying the ears of corn endwise through said head a housing enclosing said head, means for rotating said head relative to said ears, a plurality of cutting and scraping members pivotally mounted on said head independently of one another and having cutting edges and blunt ends adapted to pass circumferentially around and sever and scrape the kernels therefrom, means carried by said head for connecting said cutting and scraping members to move in unison, means for yieldingly urging all of said cutting and scraping members inwardly comprising a tension adjusting ring on said head, an adjusting screw interposed between said head and ring and extending tangentially of said ring and having threaded engagement with one and engaging a stop provided on the other thereby to permit of adjustably rotating said ring to different positions around said head and fixing said adjustment and a spring connected with said tension adjusting ring and extending generally tangential thereto and connected at its other end to urge said cutting and scraping members toward the axis of the head.

7. In a rotary corn cutter, a rotary head having a peripheral rim beveled on opposite sides and an axial opening through which the ears of corn are adapted to pass endwise, cutting and gaging devices carried by said head and engaging and passing circumferentially about said ears to sever and scrape, respectively, the kernels therefrom, means for propelling the ears of corn endwise, means for removably mounting the head in a position substantially coaxial with the ears of corn so propelled, comprising a holder including an upper part embracing the top part of said rotary head and a lower part fixed to a stationary support and embracing the lower part of said head, means separably connecting said parts and rollers carried by said parts and disposed at an angle to the axis of said head and engaging the beveled faces of said rim to support and center said head and means for rotating said head.

8. In a rotary corn cutter, a rotary head having a peripheral rim beveled on opposite sides and an axial opening through which the ears of corn are adapted to pass endwise, cutting and gaging devices carried by said head and engaging and passing circumferentially about said ears to sever and scrape, respectively, the kernels therefrom, means for propelling the ears of corn endwise, means for removably mounting the head in a position substantially coaxial with the ears of corn so propelled, comprising a holder including an upper part embracing the top part of said rotary head and a lower part fixed to a stationary support and embracing the lower part of said head, means separably connecting said parts and rollers carried by said parts and disposed at an angle to the axis of said head and engaging the beveled faces of said rim to support and center said head and means for rotating said head comprising an endless flexible drive member engaging the periphery of said head between its beveled faces, said rollers being so disposed as to oppose the tension of said endless flexible drive member.

9. In a rotary corn cutter, a rotary head including a rim having peripheral beads formed thereon and having a central opening through which the ears of corn are adapted to pass endwise, cutting and gaging devices carried by said head and engaging and passing circumferentially about said ears to sever and scrape, respectively, the kernels therefrom, means for propelling the ears of corn endwise, means for removably mounting the head in a position substantially coaxial with the ears of corn so propelled, comprising a holder including a fixed part embracing one side of the rim of said head and another part hinged to said fixed part and embracing the other side of the rim of said head, said holder being internally formed to conform closely to said rim and extending radially inward of said beads to provide internal channels in said holder and said holder being provided with holes in its bottom to provide passages leading from the bottoms of said channels to the exterior of said holder for draining said channels, rollers mounted in said holder and engaging and supporting the peripheral rim of said head, means separably connecting said holder parts and permitting them to be opened in a direction at right angles to the axis of said head to permit said head to be removed, means engaging said peripheral rim for rotating said head and means for receiving the drainings from said holes.

10. In a rotary corn cutter, a rotary head including a rim having a central peripheral portion of large diameter provided with a central groove and side portions of lesser diameter and each provided with a peripheral bead and said head having a central opening through which the ears of corn are adapted to pass endwise, cutting and gaging devices carried by said head and engaging and passing circumferentially about said ears to sever and scrape, respectively, the kernels therefrom, means for propelling the ears of corn endwise, means for removably mounting the head in a position substantially coaxial with the ears of corn so propelled, comprising a holder including a fixed part embracing one side of the rim of said head and another part hinged to said fixed part and embracing the other side of the rim of said head, said holder being internally formed to extend radially inward of said beads to provide a central annular relatively deep internal channel in said holder receiving the central portion of said rim and internal annular side channels of lesser depth in said holder receiving said beads and said holder being provided with holes in its bottom to provide passages leading from the bottoms of said channels to the exterior of said holder for draining said channels, rollers mounted in said holder and engaging and supporting the central peripheral portion of said rim and a drive belt passing through said holder, arranged in the groove in the central peripheral portion of said rim and means for receiving the drainings from said holes.

11. In a high speed rotary corn cutter, a holder having rollers, a rotary cutter head in said holder and comprising a peripheral drive rim supported by said rollers, a front annular section, a rear annular section, means for holding said sections together and clamping said driving rim therebetween, said sections providing an axial opening through said head through which said ears of corn are adapted to pass endwise and said sections and rim providing an internal annular chamber, a plurality of cutter members pivotally mounted on said front section and extending into said annular chamber, a plurality of scraper members pivotally mounted on said front section and extending into said annular chamber, said cutter and scraper members being adapted to engage and pass circumferentially around the ears of corn and cut and scrape the kernels therefrom, a ring concentric with said head and disposed in said annular chamber, means connecting said ring with each of said cutter members and scraper members and compelling them to rotate toward and from the axis of the cutter head in unison and spring means yieldingly urging said cutter and scraper members toward the axis of said rotary head, means for driving said drive rim and means for feeding ears of corn coaxially through said cutter head.

12. In a high speed rotary corn cutter, a holder having rollers, a rotary cutter head in said holder and comprising a peripheral drive rim supported by said rollers, a front annular section, a rear annular section, means for holding said sections together and clamping said driving rim therebetween, said sections providing an axial opening through said head through which said ears of corn are adapted to pass endwise and said sections and rim providing an internal annular chamber, a plurality of cutter members pivotally mounted on said front section and extending into said annular chamber, a plurality of scraper members pivotally mounted on said front section and extending into said annular chamber, said cutter and scraper members being adapted to engage and pass circumferentially around the ears of corn and cut and scrape the kernels therefrom, a ring concentric with said head and disposed in said annular chamber, means connecting said ring with each of said cutter members and scraper members and compelling them to rotate toward and from the axis of the cutter head in unison and spring means yieldingly urging said cutter and scraper members toward the axis of said rotary head comprising a tension adjusting ring mounted concentrically and externally on said rotary head, a plurality of springs connecting said tension adjusting ring with certain of said members and means for adjustably rotating said tension adjusting ring to different positions to impose varying tension on said springs and all of said members, means for driving said drive rim and means for feeding the ears of corn coaxially through said cutter head.

13. In a high speed rotary corn cutter, a rotary head having an opening extending axially therethrough, means for rotating said head, the wall forming the front of said opening being flared outwardly to form a conical forwardly discharging surface and the wall forming the rear of said opening being flared outwardly to form a conical rearwardly discharging surface, cutting means carried by said head and having a cutting edge located in the zone of said conical forwardly discharging surface and arranged to engage and pass circumferentially around said ears to cut the kernels therefrom, a scraping means carried by said head and having a blunt end located in the zone of said conical rearwardly discharging surface and arranged to engage and pass circumferentially around said ears and scrape the portion of the kernels remaining after passing said cutting edge, and means for passing the ears of corn axially through said opening, the conical forwardly and rearwardly discharging surfaces receiving the portions of the kernels cut and scraped by said cutting and scraping means, respectively, and separately discharging them from said head.

14. In a high speed rotary corn cutter, a rotary head having a radially disposed, forwardly facing flat face delimited by a conical forwardly discharging outer rim and by a bore extending axially through said head and flaring rearwardly to form a conical rearwardly discharging surface, means for rotating said head, cutter arms pivotally mounted on said head and extending along said flat face, a blade on each of said cutter arms and projecting forwardly from the plane of said flat face to engage and sever the kernels from the ears of corn and throw the cut kernels outwardly in advance of said plane, scraper arms pivotally mounted on said head and extending along said flat face, a scraper head on each of said scraper arms and projecting rearwardly from the plane of said flat face to scrape the cut kernels remaining on the cob and throw the scrapings outwardly in rear of said plane, said forwardly and rearwardly discharging conical surfaces separately collecting and discharging the cuttings and scrapings on opposite sides of said head, means yieldingly holding said cutting and scraping arms in engagement with the ears and means for conveying the ears of corn axially through said head.

15. In a high speed rotary corn cutter, a single rotary head, means for conveying the ears of corn endwise through said head, means for rotating said head relative to said ears, a cutting arm pivotally mounted on said head and having a free end extending in a radial plane toward the center of said head, a cutting blade at the free end of said arm and extending forwardly generally parallel with the axis of the head, said blade having a cutting edge at its extremity adapted to pass circumferentially about said ear and sever the kernels and having a relatively thin advance edge and having its trailing edge thickened and rounded at the corner between the arm and blade and tapering from said thickened corner both toward its cutting end and also toward its advance edge to form a scoop-like blade which quickly discharges the cut kernels radially, a scraping and gaging device pivotally carried by said head immediately adjacent, lengthwise of the ear, said cutting edge and having a blunt end which is relatively short and has relatively short contact lengthwise of the ear and adapted to scrape through to the cob, said cutting edge and blunt end being connected to move in unison so that the blunt end of said scraping device is at all times disposed inside of the cutting line of said cutting edge and the depth of the cut thereby determined by the engagement of said blunt edge with the cob and whereby said cutting edge and blunt end closely follow the undulation of the cob surface while traversing the entire length of said ear.

16. In a high speed rotary corn cutter, a single rotary head, means for conveying the ears of corn endwise through said head, means for rotating said head relative to said ears, a cutting device pivotally carried by said head and having a cutting edge adapted to pass circumferentially about said ear and sever the kernels, a scraping and gaging device pivotally carried by said head immediately adjacent, lengthwise of the ear, said cutting edge and having its extremity bent laterally and this laterally bent extremity twisted to form a head forming a broad face which rests against said ear and terminates in a rounding end which has relatively short contact lengthwise of the ear and is adapted to press through the soft interior portions to the cob, said cutting edge and blunt end being connected to move in unison so that the blunt end of the scraping device is at all times disposed inside of the cutting line of said cutting device and the depth of the cut thereby determined by the engagement of said scraping device with the cob and whereby said cutting edge and blunt end closely follow the undulation of the cob surface while traversing the entire length of the ear.

17. In a corn cutter, cutting means, means for conveying the ears of corn axially past said cutting means and means for alining the ears with the cutting means comprising a stationary plate removably inserted in the path of said ears being fed to said cutting means and having an opening through which the ears pass, arms pivotally mounted on said plate and having ends adapted to engage and aline the ears passing therethrough, means carried exclusively by said plate for compelling said arms to move toward and from the axis of the passing ears in unison and spring means interposed between said last means and said plate for yieldingly urging said arms in an inward position, said plate and the elements carried thereby forming an independent self-contained guiding unit and means for detachably securing said plate in position.

18. In a corn cutter, cutting means, means for conveying the ears of corn axially past said cutting means comprising a pair of vertically movable horizontal spur wheel shafts arranged one above the other, a spur wheel carried by each shaft and adapted to engage the corresponding side of an ear of corn, means for turning said shafts in opposite directions at the same speed and means compelling said spur wheels to move uniformly toward and from an intermediate point located at the axes of the passing ears comprising a horizontal stationary rod located intermediate said shafts, a sleeve on said rod, a sleeve on each of said shafts, means limiting the longitudinal movement of the sleeves on said shafts in one direction, links connecting said sleeves and forming a toggle linkage therebetween and a small helical compression spring urging said first sleeve in a direction along said rod in which said shafts are held in a contracted position.

19. In a corn cutter, a standard formed to provide a chamber, cutting means in said chamber and means for conveying the ears of corn axially through said chamber and past said cutting means comprising a pair of vertically movable horizontal spur wheel shafts arranged one above the other and each projecting through a vertical slot provided in one wall of said chamber, a spur wheel carried by each shaft within said chamber and adapted to engage the corresponding side of an ear of corn, means for turning said shafts in opposite directions at the same speed and means for compelling said spur wheels to move uniformly toward and from an intermediate point located at the axes of the passing ears comprising a horizontal rod arranged externally of said chamber and projecting outwardly from said one wall of said chamber and located intermediate said shafts, a sleeve on said rod, an abutment at the outer end of said rod, a compression spring interposed between said abutment and said sleeve, a sleeve mounted on each shaft and bearing against said one wall and toggle links connecting said sleeves and disposed at such an angle that said spring holds said sleeves on said shafts against said one wall and also yieldingly urges said shafts toward one another.

20. In a high speed rotary corn cutter, a single rotary head, means for conveying the ears of corn endwise through said head, means for rotating said head relative to said ears, a plurality of devices pivotally connected to said head and each having a cutting edge only and forming a group of cutting devices adapted to pass circumferentially about said ears and sever the kernels, interconnecting means compelling said group of cutting devices to move in unison toward and from the axis of said ears, a plurality of gaging devices pivotally mounted on said head and adapted to engage said ears, interconnecting means compelling said group of gaging devices to move in unison toward and from the axis of said ears, and means for adjustably connecting both of said interconnecting means to move in unison whereby said cutting devices are adjustable as a group relative to said group of gaging devices and the depth of cut of said cutting devices thereby readily altered.

21. In a high speed rotary corn cutter, a single rotary head, means for conveying the ears of corn endwise through said head, means for rotating said head relative to said ears, a plurality of devices pivotally connected to said head and each having a cutting edge only and forming a group of cutting devices adapted to pass circumferentially about said ears and sever the kernels, interconnecting means compelling said group of cutting devices to move in unison toward and from the axis of said ears, a plurality of gaging devices pivotally mounted on said head at places remote from the mountings of said cutting devices and each having a blunt end having a relatively short contact lengthwise of the ear and adapted to scrape through to the cob, interconnecting means compelling said group of gaging devices to move in unison toward and from the axis of said ears, and means for adjustably connecting both of said interconnecting means to move in unison so that the blunt ends of said group of gaging devices are at all times disposed inside of the cutting line of said cutting devices and the depth of the cut thereby determined by the engagement of said gaging devices with the cob and whereby said cutting edges and blunt ends, through said adjustably connected interconnecting means, jointly follow the undulation of the cob while traversing the entire length of the ear.

HENRY J. WHEELER.